US008249098B2

(12) United States Patent
Sakai et al.

(10) Patent No.: US 8,249,098 B2
(45) Date of Patent: Aug. 21, 2012

(54) COMMUNICATION DEVICE AND COMMUNICATION METHOD THEREOF WITH ALLOCATION PROCESSING

(75) Inventors: Kazuhiko Sakai, Yokohama (JP); Toru Igarashi, Yokohama (JP); Koichi Suzuki, Yokohama (JP); Shinya Hachisu, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 345 days.

(21) Appl. No.: 12/474,867

(22) Filed: May 29, 2009

(65) Prior Publication Data

US 2009/0296739 A1 Dec. 3, 2009

(30) Foreign Application Priority Data

Jun. 2, 2008 (JP) .................................. 2008-145184

(51) Int. Cl.
*H04J 3/16* (2006.01)
(52) U.S. Cl. ........ 370/465; 370/464; 370/473; 370/474; 455/502; 455/447; 455/103; 455/67.11
(58) Field of Classification Search .................. 370/464, 370/465, 473, 474; 455/502, 447, 103, 67.1
See application file for complete search history.

(56) References Cited

U.S. PATENT DOCUMENTS

| 2004/0095105 | A1 | 5/2004 | Nakata |
| 2005/0201295 | A1 | 9/2005 | Kim et al. |
| 2006/0209669 | A1 | 9/2006 | Nishio |
| 2007/0206561 | A1* | 9/2007 | Son et al. ....................... 370/346 |
| 2008/0009294 | A1* | 1/2008 | Cho et al. ....................... 455/451 |
| 2008/0225788 | A1* | 9/2008 | Inoue et al. .................... 370/329 |

FOREIGN PATENT DOCUMENTS

| EP | 1 575 234 A2 | 9/2005 |
| JP | 07-250124 | 9/1995 |
| JP | 2004-173353 A | 6/2004 |
| JP | 2005-167965 | 6/2005 |
| JP | 2006-325264 A | 11/2006 |
| JP | 2007-526692 | 9/2007 |
| WO | WO 2005-020488 A1 | 3/2005 |

OTHER PUBLICATIONS

IEEE Std 802.16—2005 and IEEE Std 802.16—2004/Cor1-2005, IEEE computer Society and the IEEE Microwave Theory and Techniques Society, Feb. 2006.*
IEEE Computer Society and IEEE Microwave Theory and Techniques Society, Part 16: Air Interface for Fixed and Mobile Broadband Wireless Access Systems, IEEE Standard for Local and metropolitan area networks, Feb. 28, 2006.

* cited by examiner

*Primary Examiner* — Brian D Nguyen
*Assistant Examiner* — Siming Liu
(74) *Attorney, Agent, or Firm* — Arent Fox LLP

(57) ABSTRACT

A first control data generation unit configured to generate first control data, a control data allocation processing unit configured to perform allocation processing for the first control data in order to reserve an area for the first control data in a frame memory, a data write control unit configured to write user data in an area in the frame memory except the area where the allocation processing is performed, and a transmission unit configured to transmit transmission data based on the data written in the frame memory are included, and the data write control unit writes the generated first control data in the area where the allocation processing is performed in the frame memory after generation of the first control data and after the allocation processing of the first control data and after writing the user data and before the transmission data is transmitted.

12 Claims, 18 Drawing Sheets

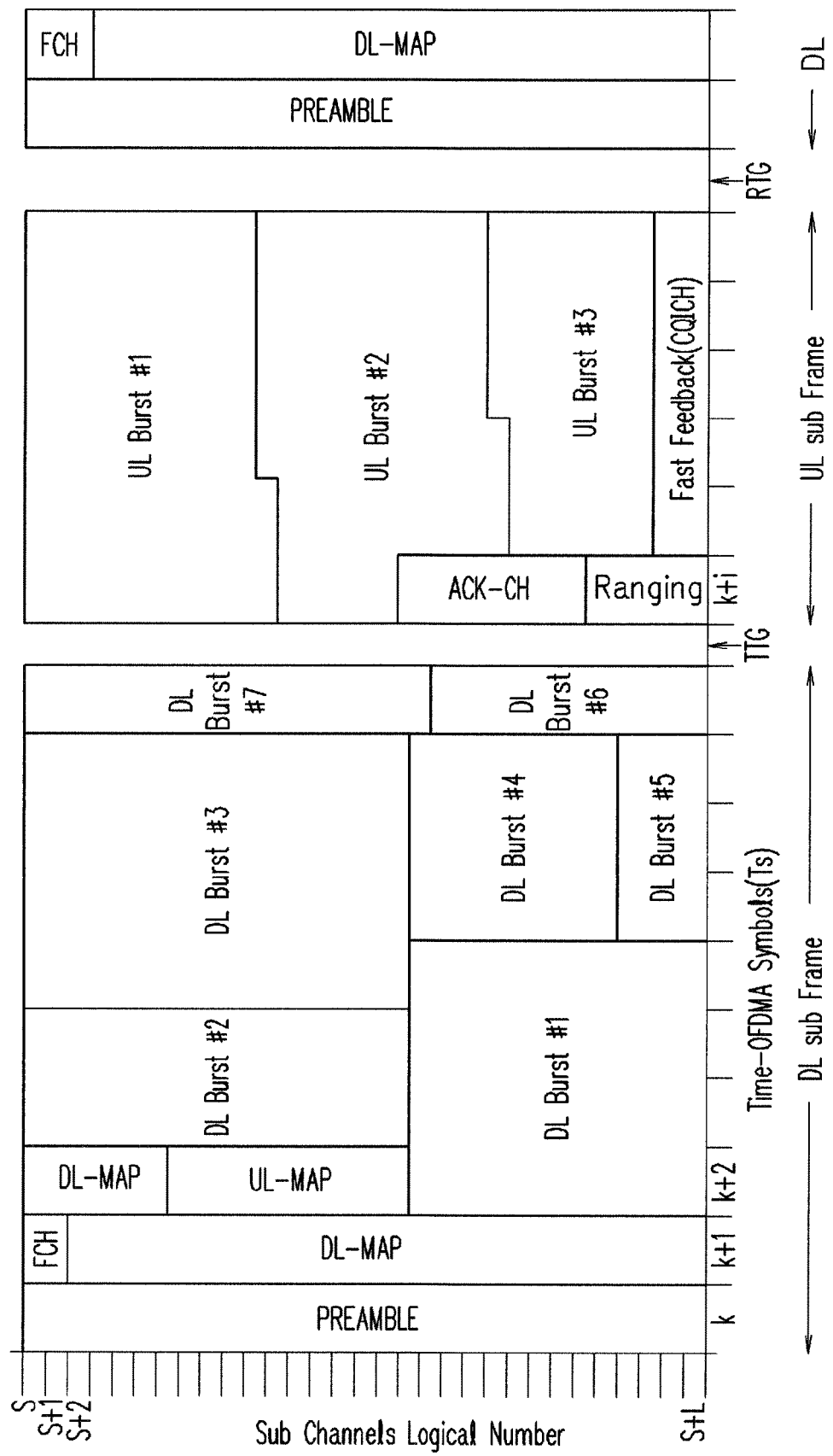
F I G. 2

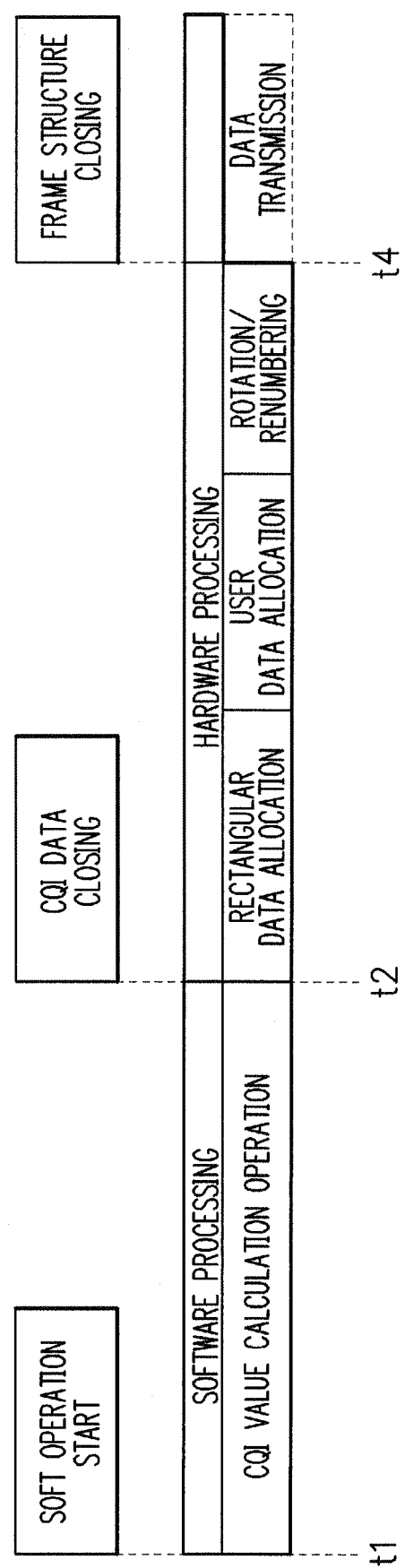
F I G. 3

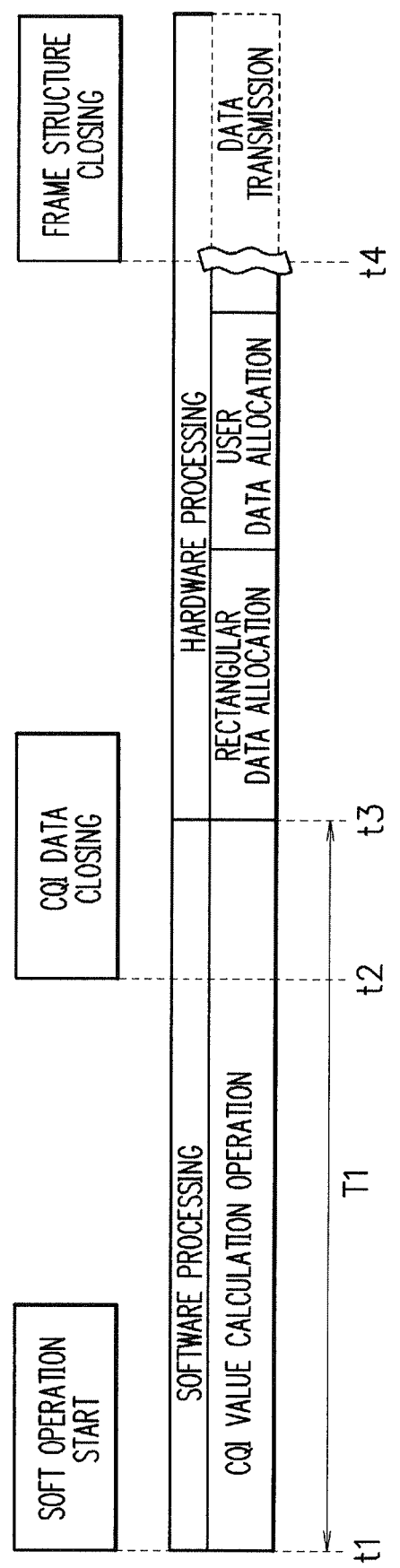

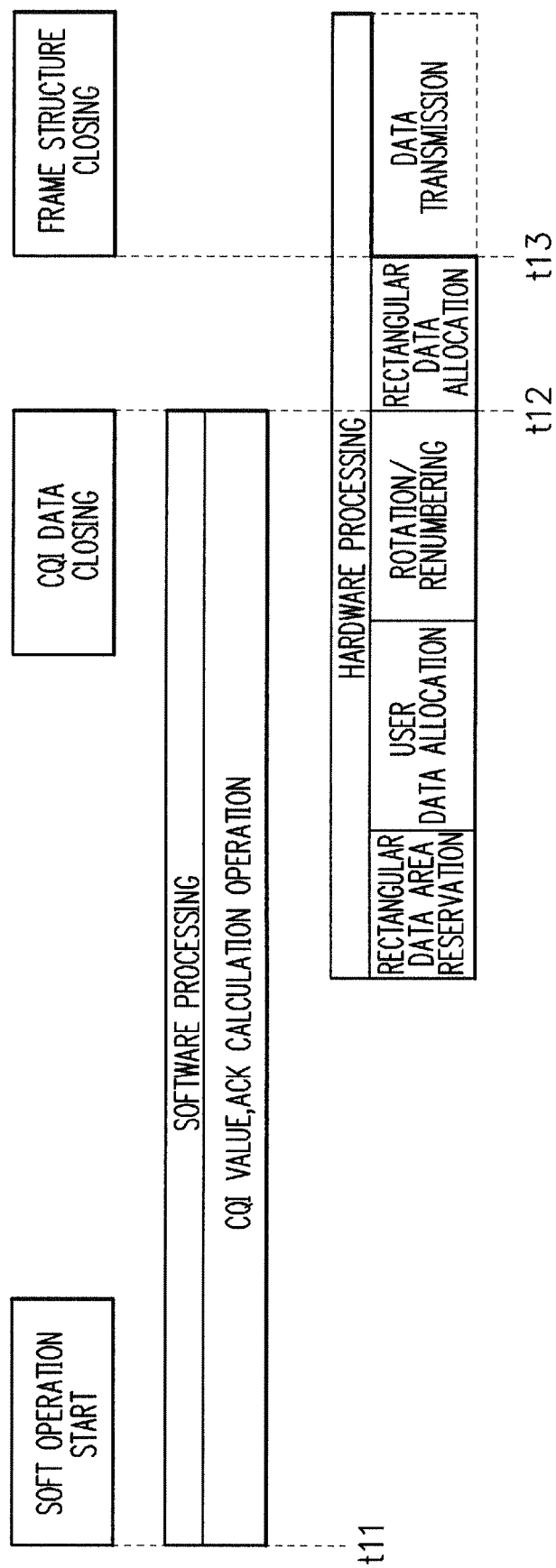

FIG. 6B

| | TIME AXIS DIRECTION (MAXIMUM NUMBER=8) | | | | | | | |
|---|---|---|---|---|---|---|---|---|
| | SLOT | | | | | | | |
| | 0 | 1 | 2 | 3 | 4 | 5 | 6 | 7 |
| 0 | | | | | | | | |
| 1 | | | | 1 | | 2 | | |
| 2 | | | 3 | | | 4 | | |
| 3 | | | 5 | | | 6 | | |
| 4 | | | 7 | | | 8 | | |
| 5 | | | 9 | | | 10 | | |
| 6 | | | 11 | 12 | 13 | | | |
| ... | ... | ... | ... | ... | ... | ... | ... | ... |
| 34 | | | | | | | | |
| 35 | | | | | | | | |
| 36 | | | | | | | | |
| ... | ... | ... | ... | ... | ... | ... | ... | ... |
| 94 | | | | | | | | |
| 95 | | | | | | | | |

(FREQUENCY DIRECTION (MAXIMUM NUMBER=96) / SUB CHANNEL)

TIME AXIS DIRECTION (MAXIMUM NUMBER=8)
SLOT

|   | 0 | 1 | 2 | 3 | 4 | 5 | 6 | 7 |
|---|---|---|---|---|---|---|---|---|
| 0 |   |   |   |   |   |   |   |   |
| 1 |   |   |   | 85 |   | 93 |   |   |
| 2 |   |   |   | 86 |   | 94 |   |   |
| 3 |   |   |   | 87 |   | 95 |   |   |
| 4 |   |   |   | 88 | 91 | 96 |   |   |
| 5 |   |   |   | 89 | RECTANGULAR AND | 97 |   |   |
| 6 |   |   |   | 90 | ALLOCATION IS COMPLETED | 92 |   |   |
| ... | ... | ... | ... | ... | ... | ... | ... | ... |
| 34 |   |   |   |   |   |   |   |   |
| 35 |   |   |   |   |   |   |   |   |
| 36 |   |   |   |   |   |   |   |   |
| ... | ... | ... | ... | ... | ... | ... | ... | ... |
| 94 |   |   |   |   |   |   |   |   |
| 95 |   |   |   |   |   |   |   |   |

SUB CHANNEL
FREQUENCY DIRECTION (MAXIMUM NUMBER=96)

DURATION (9) : 13  — 1011
1012
903
912

FIG. 11B

UL_FRAMEMEMORY — 1111

| SLOT_ADDRESS | DATA |
|---|---|
| 0 | |
| 1 | |
| ... | AREA IS ALLOCATED IN PREVIOUS ZONE |
| 83 | |
| 84 | |
| 85 | ALLOCATED AS DATA AREA OF FIRST SLOT WHOSE BURST ID IS FIVE |
| 86 | ALLOCATED AS DATA AREA OF SECOND SLOT WHOSE BURST ID IS FIVE |
| 87 | ALLOCATED AS DATA AREA OF THIRD SLOT WHOSE BURST ID IS FIVE |
| 88 | ALLOCATED AS DATA AREA OF FOURTH SLOT WHOSE BURST ID IS FIVE |
| 89 | ALLOCATED AS DATA AREA OF FIFTH SLOT WHOSE BURST ID IS FIVE |
| 90 | ALLOCATED AS DATA AREA OF SIXTH SLOT WHOSE BURST ID IS FIVE |
| 91 | ALLOCATED AS DATA AREA OF SEVENTH SLOT WHOSE BURST ID IS FIVE |
| 92 | ALLOCATED AS DATA AREA OF EIGHTH SLOT WHOSE BURST ID IS FIVE |
| 93 | ALLOCATED AS DATA AREA OF NINTH SLOT WHOSE BURST ID IS FIVE |
| 94 | ALLOCATED AS DATA AREA OF TENTH SLOT WHOSE BURST ID IS FIVE |
| 95 | ALLOCATED AS DATA AREA OF 11TH SLOT WHOSE BURST ID IS FIVE |
| 96 | ALLOCATED AS DATA AREA OF 12TH SLOT WHOSE BURST ID IS FIVE |
| 97 | ALLOCATED AS DATA AREA OF 13TH SLOT WHOSE BURST ID IS FIVE |
| 98 | DATA AREA OF FIRST SLOT OF ANOTHER BURST ID |
| ... | |

F I G. 12B

| SLOT_ADDRESS | UL_FRAMEMEMORY DATA |
|---|---|
| 0 | |
| 1 | AREA IS ALLOCATED IN PREVIOUS ZONE |
| ... | |
| 83 | |
| 84 | |
| 85 | ALLOCATED AS DATA AREA OF FIRST SLOT WHOSE BURST ID IS FIVE |
| 86 | ALLOCATED AS DATA AREA OF SECOND SLOT WHOSE BURST ID IS FIVE |
| 87 | ALLOCATED AS DATA AREA OF THIRD SLOT WHOSE BURST ID IS FIVE |
| ... | ... |
| 95 | ALLOCATED AS DATA AREA OF 11TH SLOT WHOSE BURST ID IS FIVE |
| 96 | ALLOCATED AS DATA AREA OF 12TH SLOT WHOSE BURST ID IS FIVE |
| 97 | ALLOCATED AS DATA AREA OF 13TH SLOT WHOSE BURST ID IS FIVE |
| 98 | ALLOCATED AS DATA AREA OF FIRST SLOT WHOSE BURST ID IS FOUR |
| 99 | ALLOCATED AS DATA AREA OF SECOND SLOT WHOSE BURST ID IS FOUR |
| 100 | ALLOCATED AS DATA AREA OF THIRD SLOT WHOSE BURST ID IS FOUR |
| 101 | ALLOCATED AS DATA AREA OF FOURTH SLOT WHOSE BURST ID IS FOUR |
| 102 | ALLOCATED AS DATA AREA OF FIFTH SLOT WHOSE BURST ID IS FOUR |
| 103 | ALLOCATED AS DATA AREA OF SIXTH SLOT WHOSE BURST ID IS FOUR |
| 104 | DATA AREA OF FIRST SLOT OF ANOTHER BURST ID |
| ... | ... |

1211

F I G. 13A
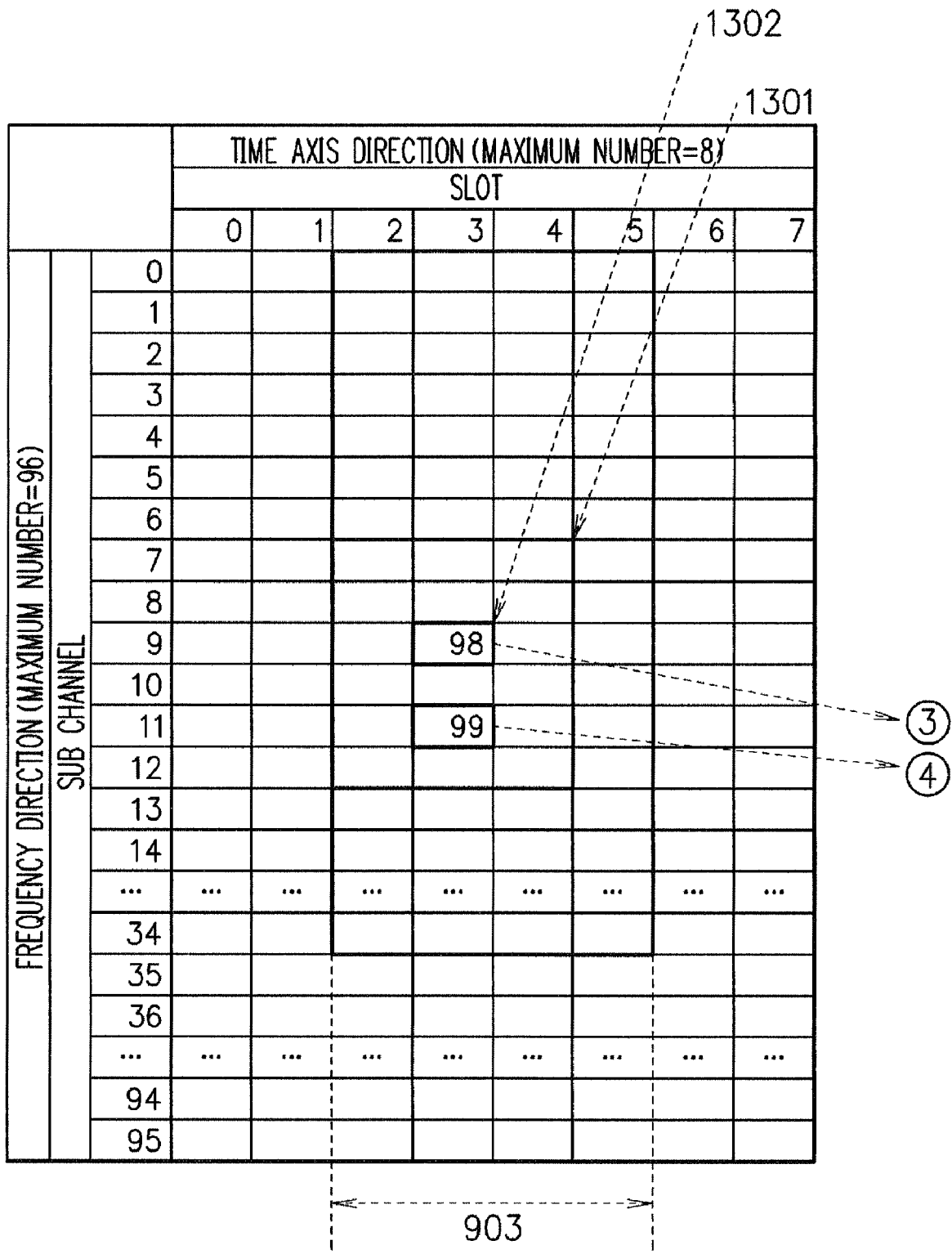

F I G. 13B

| SLOT_ADDRESS | UL_FRAMEMEMORY DATA |
|---|---|
| 0 | AREA IS ALLOCATED IN PREVIOUS ZONE |
| 1 | |
| ... | |
| 83 | |
| 84 | |
| 85 | ALLOCATED AS DATA AREA OF FIRST SLOT WHOSE BURST ID IS FIVE |
| 86 | ALLOCATED AS DATA AREA OF SECOND SLOT WHOSE BURST ID IS FIVE |
| 87 | ALLOCATED AS DATA AREA OF THIRD SLOT WHOSE BURST ID IS FIVE |
| ... | ... |
| 95 | ALLOCATED AS DATA AREA OF 11TH SLOT WHOSE BURST ID IS FIVE |
| 96 | ALLOCATED AS DATA AREA OF 12TH SLOT WHOSE BURST ID IS FIVE |
| 97 | ALLOCATED AS DATA AREA OF 13TH SLOT WHOSE BURST ID IS FIVE |
| 98 | ALLOCATED AS DATA AREA OF FIRST SLOT WHOSE BURST ID IS FOUR |
| 99 | ALLOCATED AS DATA AREA OF SECOND SLOT WHOSE BURST ID IS FOUR |
| 100 | DATA AREA OF FIRST SLOT OF ANOTHER BURST ID |
| ... | ... |

1311

COMMUNICATION DEVICE AND COMMUNICATION METHOD THEREOF WITH ALLOCATION PROCESSING

CROSS-REFERENCE TO RELATED APPLICATIONS

This application is based upon and claims the benefit of priority of the prior Japanese Patent Application No. 2008-145184, filed on Jun. 2, 2008, the entire contents of which are incorporated herein by reference.

FIELD

The present embodiment relates to a communication device and a communication method thereof.

BACKGROUND

In recent years, a broadband has been requested with respect to a broadband wireless communication system. There exists WiMAX (Worldwide Interoperability for Microwave Access) to which, for example, an orthogonal frequency division multiplexing (OFDM)/orthogonal frequency division multiple access (OFDMA) method is applied in the broadband wireless communication system. WiMAX is also called IEEE (Institute of Electrical and Electronic Engineers) 802.16e.

The OFDM/OFDMA method is a method to communicate by multiplexing a plurality of different frequencies. Hereinafter, WiMAX will be explained as one example of the broadband wireless communication system to which the OFDM/OFDMA method is applied.

FIG. 2 is a view depicting one example of a frame structure of OFDMA WiMAX. A horizontal axis thereof indicates OFDMA symbols (time), and a vertical axis thereof indicates subchannels logical numbers (frequencies). A frame is structured by a set of a downlink sub frame (DL sub Frame) and an uplink sub frame (UL sub Frame). The downlink sub frame is a sub frame for reception, and the uplink sub frame is a sub frame for transmission.

The downlink sub frame is structured by a preamble (PREAMBLE), a frame control header (FCH), downlink maps (DL-MAP), an uplink map (UL-MAP), and a plurality of downlink bursts (DL Burst #1 to #7). The preamble represents a first mark of the frame. The frame control header includes control data. The downlink man represents data allocation information in the downlink sub frame. The uplink map represents data allocation information in the uplink sub frame. The downlink bursts represent user data.

The uplink sub frame is structured by a ranging channel (Ranging) such as initial ranging, periodic ranging, bandwidth request ranging, and handover ranging, an acknowledgement channel (ACK-CH) for HARQ, a fast feedback channel (CQICH), uplink bursts (UL Burst #1 to #3) from a plurality of terminals, and so on.

Herein, data types in the uplink sub frame are broadly divided into two types, the ranging channel, the acknowledgement channel, and the fast feedback channel are called the control data, and the uplink bursts are called the user data.

The control data is placed as the control data for transmission/reception of data for electric power control, timing control and transmission quality necessary for wireless communication, and the user data is placed as transmission/reception data such as audio data, image/moving image data with a user.

Herein, the fast feedback channel in the control data is a slot to be allocated periodically in order that control information such as channel quality indicator (CQI) notification and a request to switch an anchor wireless base station for handover (transferring a mobile station from one base station to another) is instructed immediately to a wireless base station. The single slot includes a plurality of OFDMA symbols.

Further, the channel quality indicator (CQI) notification represents a channel quality transmission method, and a base station device performs frequency scheduling by allocating data that the base station device transmits to each mobile station to a subcarrier whose reception quality is good, and thereby, the mobile station transmits each of the channel quality indicators (CQI) in each subcarrier with respect to all the subcarriers to the base station device. The base station device determines the subcarriers, a modulation method, and a coding rate used in each of the mobile stations considering the channel quality indicators (CQI) transmitted from each of the mobile stations in accordance with predetermined scheduling algorithm. A single subchannel includes the plurality of subcarriers (frequencies).

FIG. 3 is a view depicting a schedule of frame structure processing in a mobile station device. A time t1 represents a software operation start time. At the time t1, calculation operation processing of a CQI value (data) is performed by software processing.

A time t2 represents a closing time of the CQI data. After the time t2, rectangular data allocation processing, user data allocation processing, and rotation/renumbering processing is performed by hardware processing.

The mobile station structures the uplink sub frame with each of the control data including the channel quality indicators (CQI) and the user data, however, there exists a rule in a allocation method of the data in a frame structure. It is determined so that the control data secures an area rectangularly to allocate rectangular data thereto, and the user data is allocated thereto avoiding the control data. Therefore, in general, the control data such as the ranging channel, the acknowledgement channel, and the fast feedback channel is allocated on the uplink sub frame rectangularly, and then the user data is allocated on the uplink sub frame avoiding the area where the control data is allocated, and thereby the uplink sub frame is structured.

After that, when designation is given, the rotation/renumbering processing is performed. The rotation processing is a function to reallocate (randomize) the above-described logical allocation area in accordance with a rule. A method thereof is defined in IEEE 802.16-2004/802.16e (8. 4. 6. 2. 6). Concretely, data corresponding to the subchannel to be an object in each slot column in a time axis direction is rotated in a frequency direction, and thereby allocation is changed. The renumbering processing is processing to reallocate the data to the subchannel indicated by an effective bitmap depending on physical bit map information with respect to the result after the rotation processing to convert to physical mapping.

After the above-described processing is completed, at a time t4, the data is transmitted in synchronization with a transmission timing of the uplink sub frame. The time t4 represents a closing time of the frame structure.

However, there arise problems as will be described below in the frame structure processing. Normally, a calculation of the CQI value is performed including the software processing, and a large number of operation processing is necessary, resulting that it is common that a long period of time may be needed. Further, the mobile station device that receives an instruction from the wireless base station has to transmit the fast feedback channel to the uplink sub frame of the subsequent frame, therefore, time for the calculation of the CQI value is limited.

Also, as for the structure of the uplink sub frame, there exists the rule in the allocation method as described above, accordingly, the CQI data has to be set prior to the user data. Further, in the case when the subsequent processing of rotation/renumbering is needed after the data is allocated, the time t2, which is the closing time of the CQI value, is needed to be set in consideration of the above processing time.

Consequently, time for calculating the CQI value becomes short and the software processing is oppressed to be in time for the closing time t2.

FIG. 4 is a view depicting an example of the schedule of the frame structure processing in the case when CQI value calculation processing is in time for the time t2, and corresponds to FIG. 3. It is set as follows, an operation amount becomes large in the CQI value calculation processing, and thus a period of time T1, which is from the time t1 to a time t3, is taken, and the time t3, which is the time when the CQI value calculation processing ends, passes the time t2, which is the closing time of the CQI data. In this case, the CQI data cannot be transmitted at the time t4, which is the closing time of the frame structure, resulting that communication abnormality is caused.

Japanese Laid-open Patent Publication No. 2006-325264 discloses a base station device, which is a base station device performing wireless communication by using a multicarrier communication band divided into a plurality of blocks, and includes: an allocation unit allocating one of the plurality of blocks to first transmission data based on communication quality of each of the blocks, whereas allocating one of the plurality of blocks to second transmission data different from the first transmission data not being based on the communication quality of each of the blocks but in accordance with a predetermined pattern; and a hopping unit performing frequency hopping for the first transmission data and the second transmission data allocated to each of the blocks in each of the blocks.

Further, International Publication Pamphlet No. WO2005/020488 discloses a wireless communication device including: a subcarrier allocation unit allocating first data meeting a predetermined condition to a subcarrier selected by scheduling based on reception quality information indicating reception quality of each communication partner and request transmission rate information indicating a request transmission rate of each communication partner, whereas allocating second data different from the first data to a predetermined subcarrier; and a transmission unit transmitting the first data and the second data allocated to the subcarrier by the subcarrier allocation unit.

Further, Translated National Publication of Patent Application No. 2007-526692 discloses a CQI transmission method, which is a method in which a receiver station transmits a channel quality indicator to a transmitter station in a wireless communication system including a diversity mode consisted of spaced apart subcarriers and a band adaptive modulation and coding (AMC) mode consisted of a number of bands including a predetermined number of adjacent subcarriers, and includes the steps of: transmitting an average carrier to interference and noise ratio (CINR) value for a full frequency in the case when the receiver station operates in the diversity mode; and transmitting a different CINR of a predetermined number of bins in the case when the receiver station operates in the band AMC mode.

SUMMARY

A communication device of the present embodiment includes: a first control data generation unit configured to generate first control data; a control data allocation processing unit configured to perform allocation processing for the first control data in order to reserve an area for the first control data in a frame memory; a data write control unit configured to write user data in an area in the frame memory except the area where the allocation processing is performed; and a transmission unit configured to transmit transmission data based on the data written in the frame memory, and the data write control unit writes the generated first control data in the area where the allocation processing is performed in the frame memory after generation of the first control data, and after the allocation processing of the first control data, and after writing the user data, and before the transmission data is transmitted.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWINGS

FIG. 2 is a view depicting one example of a frame structure of OFDMA WiMAX;

FIG. 3 is a view depicting a schedule of frame structure processing in a mobile station device;

FIG. 4 is a view depicting an example of the schedule of the frame structure processing in the case when CQI value calculation processing is not in time for a closing time of CQI data;

FIG. 5 is a view depicting a schedule of frame structure processing (a communication method) in the mobile station terminal device according to the present embodiment;

FIGS. 6A and 6B are views to explain a method how an uplink sub frame structure unit allocates bursts to logical allocation information;

FIGS. 11A and 11B are explanatory views of duration burst address assignment processing;

FIGS. 12A and 12B are explanatory views of rectangular burst address assignment processing; and FIGS. 13A and 13B are explanatory views of the rectangular burst address assignment processing.

DESCRIPTION OF EMBODIMENTS

Figure 1:
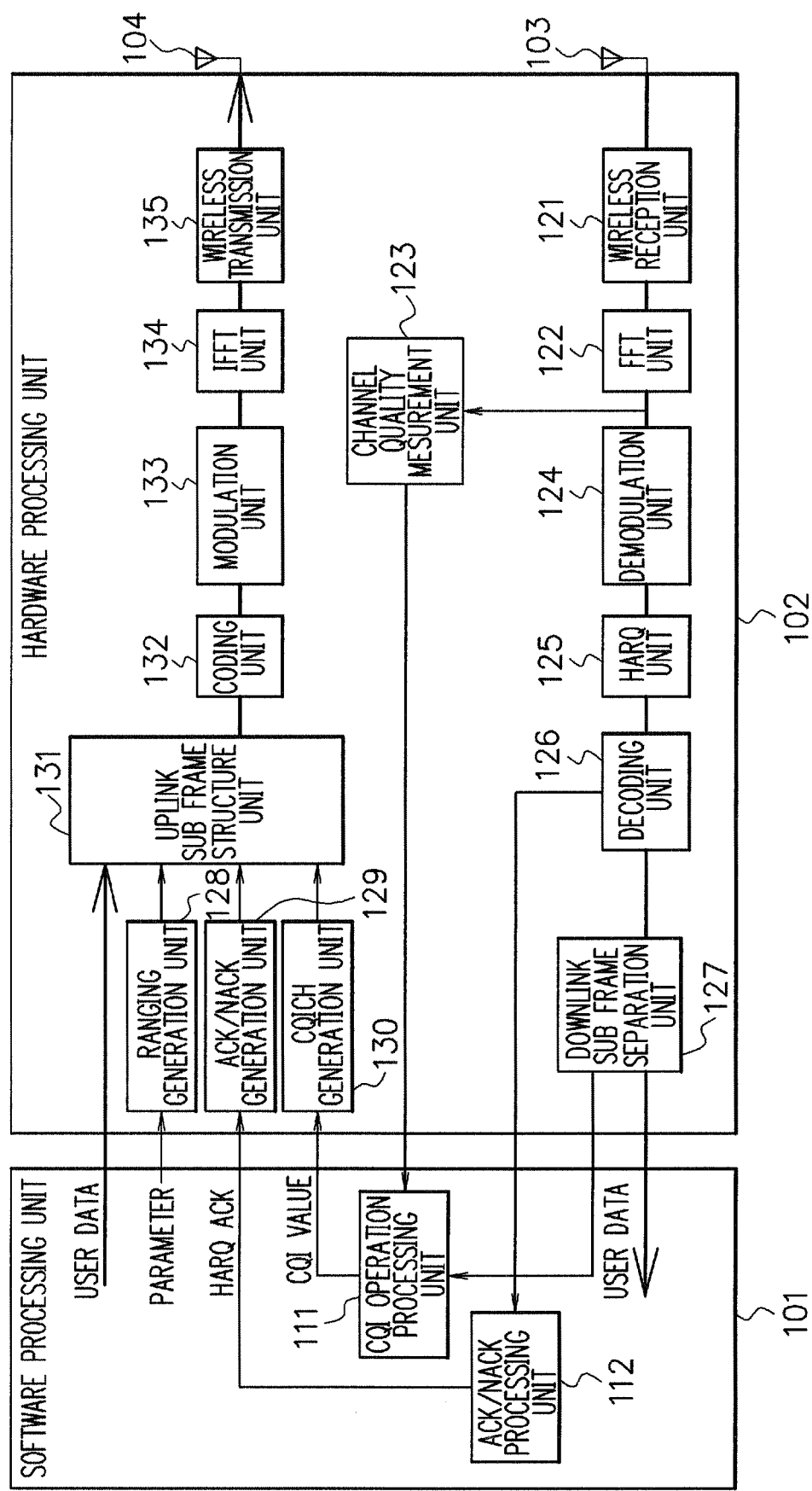
FIG. 1 is a block diagram depicting a constitution example of a mobile station terminal device (communication device) according to the present embodiment.

FIG. 1 is a block diagram depicting a constitution example of a mobile station terminal device (communication device) according to the present embodiment. An orthogonal frequency division multiplexing/orthogonal frequency division multiple access method is applied to the mobile station terminal device, and communication is performed with a base station device by a time division duplex method. A transmission frame in the time division duplex method is structured by, as depicted in FIG. 2, a downlink sub frame (DL sub Frame) and an unlink sub frame (UL sub Frame). An explanation of FIG. 2 is the same as the above. The mobile station terminal device receives the downlink sub frame from the base station device and transmits the uplink sub frame to the base station device. A wireless communication system including the mobile station terminal device and the base station device includes a plurality of antennas, and also corresponds to performing communication by multiple input multiple output (MIMO) technique.

The mobile station terminal device includes a software processing unit 101, a hardware processing unit 102, and antennas 103, 104. The software processing unit 101 includes a channel quality indicator (CQI) operation processing unit 111 and an acknowledgement (ACK)/negative acknowledgement (NACK) processing unit 112. The hardware processing unit 102 includes a wireless reception unit 121, a fast Fourier transform (FFT) unit 122, a channel quality measurement unit 123, a demodulation unit 124, a hybrid automatic repeat request (HARQ) unit 125, a decoding unit 126, a downlink sub frame separation unit 127, a ranging generation unit 128, an ACK/NACK generation unit 129, a channel quality indicator channel (CQICH) generation unit 130, an uplink sub frame structure unit 131, a coding unit 132, a modulation unit 133, an inverse fast Fourier transform (IFFT) unit 134, and a wireless transmission unit 135.

The wireless reception unit 121 downconverts a reception signal received via the antenna 103 from the base station device from a wireless frequency to a baseband frequency to output the reception signal to the FFT unit 122.

The FFT unit 122 performs fast Fourier transform processing for the input reception signal to output the reception signal to the demodulation unit 124 and the channel quality measurement unit 123.

The channel quality measurement unit 123 measures reception quality by the reception signal input from the FFT unit 122 to output measured reception quality information to the CQI operation processing unit 111 in the software processing unit 101. That is, the channel quality measurement unit 123 obtains a measurement value indicating arbitrary reception quality such as a CIR (Carrier to Interferer Ratio) or a SIR (Signal to Interferer Ratio) to output the obtained measurement value to the CQI operation processing unit 111 as the reception quality information.

The demodulation unit 124 demodulates the reception signal input from the FFT unit 122 to output the reception signal to the HARQ unit 125.

The HARQ unit 125 performs hybrid automatic repeat request processing for the reception signal input from the demodulation unit 124 to output the reception signal to the decoding unit 126. Concretely, the hybrid automatic repeat request processing is performed in order to increase error correcting capability by combining an erroneous reception packet, which is not abandoned but repeated, and a received packet with an error correcting code and an error detecting code.

The decoding unit 126 decodes the reception signal input from the HARQ unit 125 to output downlink sub frame data to the downlink sub frame separation unit 127. Further, the decoding unit 126 decodes the error detecting code to output error detecting result information to the ACK/NACK processing unit 112.

The downlink sub frame separation unit 127 inputs the downlink sub frame data from the decoding unit 126, and analyzes the data to separate into a necessary data form, and outputs the data to the software processing unit 101 as user data.

The ACK/NACK processing unit 112 outputs ACK/NACK (HARQ ACK) information to the ACK/NACK generation unit 129 so that a negative acknowledge (NACK) signal being an error judging signal is transmitted if repeating is necessary, further, an acknowledge (ACK) signal being an error judging signal is transmitted if repeating is not necessary by the error detecting result information input from the decoding unit 126.

The CQI operation processing unit 111 generates a channel quality indicator (CQI) in each subcarrier from the reception quality information input from the channel quality measurement unit 123 in the case when it is controlled to generate the channel quality indicator (CQI). The CQI operation processing unit 111 generates the single channel quality indicator (CQI) with respect to the single subcarrier. And then, the CQI operation processing unit 111 outputs a generated CQI value to the CQICH generation unit 130.

The ranging generation unit 128 generates ranging data by determined ranging code generation algorithm to output the ranging data to the uplink sub frame structure unit 131 in the case when it is controlled to generate the ranging data by the software processing unit 101. The ranging data is control data being communicated with the base station device before communication at the time of power application.

The ACK/NACK generation unit 129 generates the ACK/NACK signal by determined generation algorithm to output the ACK/NACK signal to the uplink sub frame structure unit 131 in the case when it is controlled to generate the error judging signal of ACK or NACK by the ACK/NACK processing unit 112.

The CQICH generation unit 130 inputs the CQI value from the CQI operation processing unit 111, and generates a CQICH signal by determined generation algorithm to output the CQICH signal to the uplink sub frame structure unit 131.

The uplink sub frame structure unit 131 inputs the user data processed in the software processing unit 101, the ranging data generated in the ranging generation unit 128, the ACK/NACK signal generated in the ACK/NACK generation unit 129, and the CQICH signal generated in the CQICH generation unit 130, and structures the uplink sub frame to output uplink sub frame data to the coding unit 132.

The coding unit 132 codes the uplink sub frame data input from the uplink sub frame structure unit 131 to output the uplink sub frame data to the modulation unit 133.

The modulation unit 133 modulates the uplink sub frame data input from the coding unit 132 to output transmission data to the IFFT unit 134.

The IFFT unit 134 performs invert fast Fourier transform for the transmission data input from the modulation unit 133 to output the transmission data to the wireless transmission unit 135.

The wireless transmission unit 135 upconverts the transmission data input from the IFFT unit 134 from the baseband frequency to the wireless frequency, and the like to transmit the transmission data to the base station device via the antenna 104.

Figure 6A:
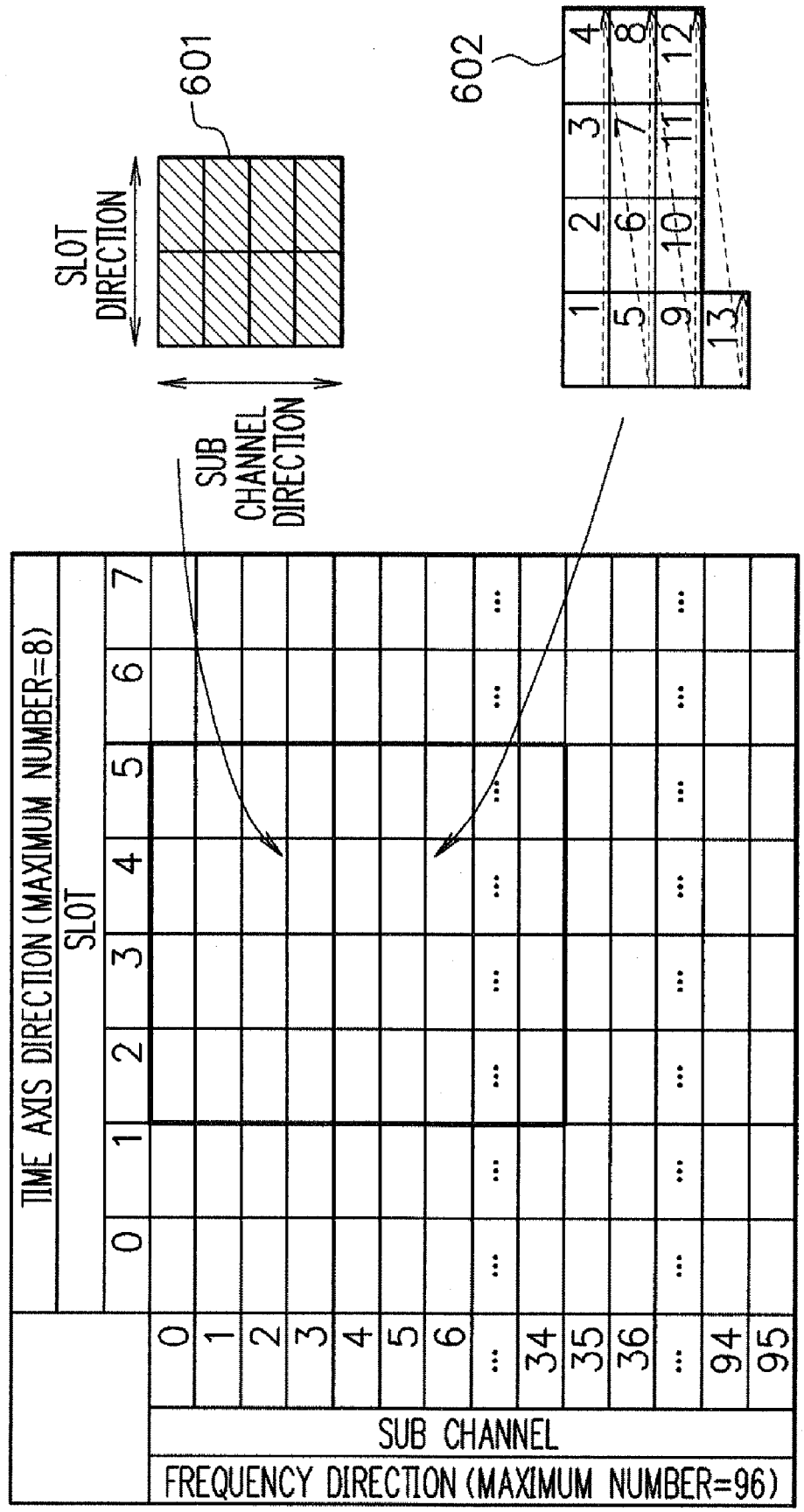

FIGS. 6A and 6B are views to explain a method how the uplink sub frame structure unit 131 allocates bursts to logical allocation information. FIG. 6A depicts a state before allocation processing of the bursts, and FIG. 6 depicts a state after the allocation processing of the bursts. A horizontal axis indicates slots in a time axis direction, and a vertical axis indicates subchannels in a frequency direction, and FIGS. 6A and 6B correspond to FIG. 2. The single slot includes a plurality of OFDMA symbols.

Note that there is explained a case when a maximum slot number is set as eight and a maximum subchannel number is set as 96 in FIGS. 6A and 6B, FIGS. 9A and 9B, FIGS. 10A and 10B, FIGS. 11A and 11B, FIGS. 12A and 12B, and FIGS. 13A and 13B as an example, however, which is not limited to this.

A rectangular burst 601 is a rectangular burst formed by, for example, two slots in a slot direction and four subchannels in a subchannel direction. Control data (a ranging channel, an acknowledgement channel, and a fast feedback channel (CQICH)) in FIG. 2 is allocated by the rectangular burst 601.

A duration burst 602 is allocated from upper left toward right in an area thereof, and then is allocated from the left of the subjacent subchannel toward right, and sequentially is allocated down to the lowest subchannel. User data (uplink bursts (UL Burst #1 to #3)) in FIG. 2 is allocated by the duration burst 602.

The uplink sub frame structure unit 131 compares a storage area such as a register and a memory inside to a logical allocation area, and secures an allocatable area for burst data by using an analysis result of an uplink map (UL-MAP) in FIG. 2 from the software processing unit 101. The above operation is defined such that "a burst is allocated". The burst data to be allocated has two types of the rectangular burst 601 and the duration burst 602. The rectangular burst 601 and the duration burst 602 are different in the way how data volume in allocation is defined, and therefore are different in an allocation method thereof as well.

The duration burst 602 defines an allocation area thereof only by a length in the slot direction (a horizontal direction). By contrast, the rectangular burst 601 defines an allocation area thereof by the length in the slot direction (horizontal direction) and a length in the subchannel direction (a vertical direction) two-dimensionally. The allocation areas of the rectangular burst 601 and the duration burst 602 can be mixed on the same uplink sub frame, however, cannot be overlapped thereon.

The order of allocation is explained. As depicted in FIG. 6B, firstly the rectangular burst 601 is allocated. And then, the duration burst 602 is allocated. The duration burst 602 is allocated to avoid the rectangular burst 601.

Figure 7:
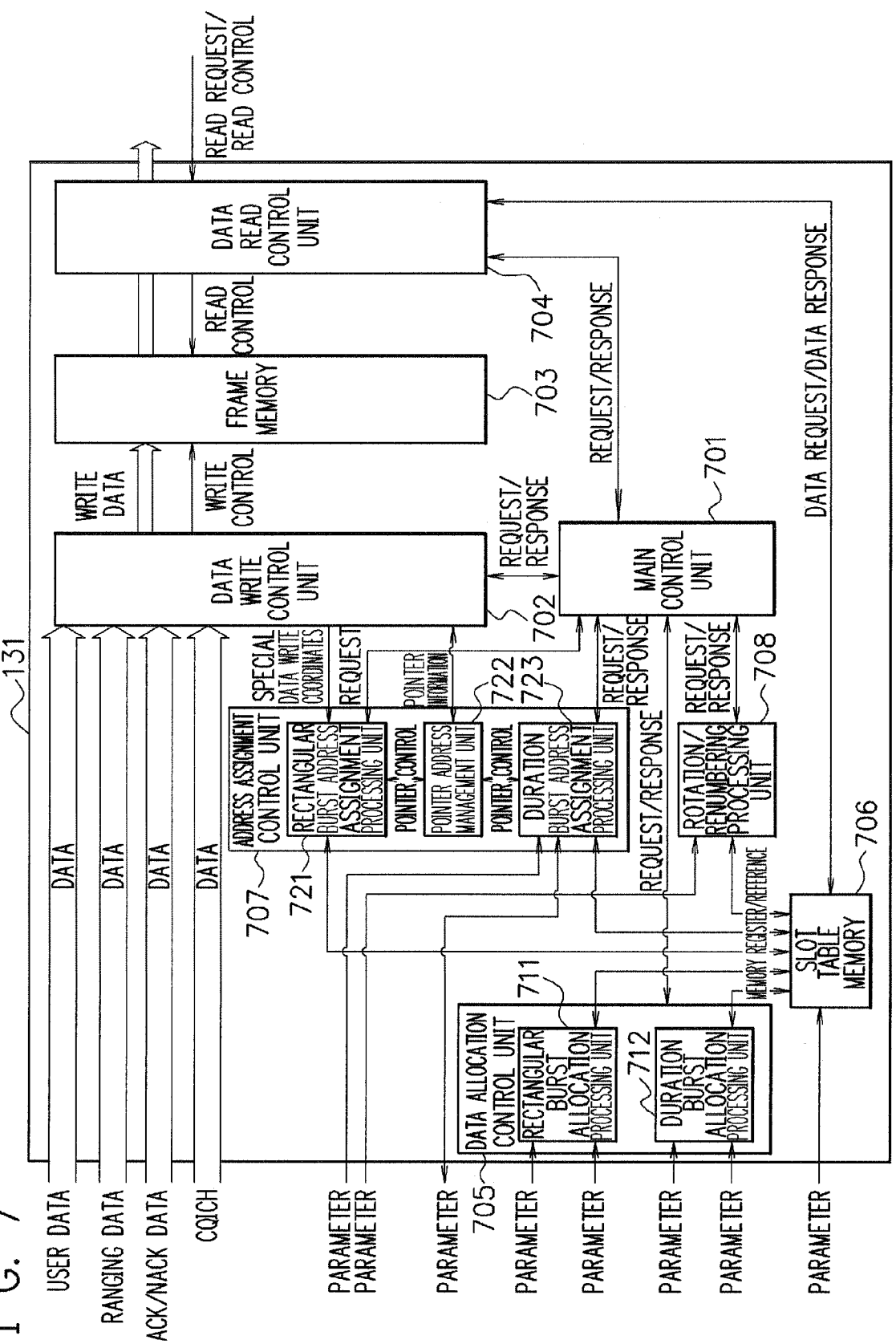
FIG. 7 is a block diagram depicting a functional block example in the uplink sub frame structure unit.

FIG. 7 is a block diagram depicting a functional block example of the uplink sub frame structure unit 131 in FIG. 1. The uplink sub frame structure unit 131 includes a main control unit 701, a data write control unit 702, a frame memory 703, a data read control unit 704, a data allocation control unit 705, a slot table memory 706, an address assignment control unit 707, and a rotation/renumbering processing unit 708. The data allocation control unit 705 includes a rectangular burst allocation processing unit 711 and a duration burst allocation processing unit 712. The address assignment control unit 707 includes a rectangular burst address assignment processing unit 721, a pointer address management unit 722, and a duration burst address assignment processing unit 723.

The main control unit 701 outputs a processing start request to each of the functional blocks and receives processing completion notification from each of the functional blocks, and manages and controls whole processing sequence.

The data write control unit 702 writes duration burst data (the user data) and rectangular burst data (the control data) that are transferred externally in the frame memory 703 in the order in which the burst is allocated. The data read control unit 704 reads the data from the frame memory 703. Writing/reading data in/from the frame memory 703 is performed in each subcarrier. The single subchannel includes the plurality of subcarriers. Position information of the above-described allocation area is used as writing/reading addresses of the frame memory 703 instead. A data writing timing in the data write control unit 702 is such that data writing is started at the time of receiving the duration burst data or at the time of generating the rectangular burst data, and data writing is completed when writing the burst data for one frame is completed. Details thereof will be explained later with reference to FIG. 8. A data reading timing in the data read control unit 704 is such that reading is started by a data request from the coding unit 132 at a subsequent stage regardless of the burst types, and reading is completed when the request is stopped.

The rectangular burst allocation processing unit 711 starts rectangular burst allocation processing in the slot table memory 706 when receiving a rectangular burst allocation start request from the main control unit 701. As for burst information provided by a parameter by the software processing unit 101, the rectangular burst allocation processing unit 711 searches whether the rectangular burst exists or not sequentially, and performs the allocation processing every time the rectangular burst is recognized, and repeats the allocation processing for the number of times corresponding to the number of bursts. Further, the rectangular burst allocation processing unit 711 outputs rectangular burst allocation end notification to the main control unit 701 when the allocation processing is completed. Details of the processing in the rectangular burst allocation processing unit 711 will be explained later with reference to FIGS. 9A and 9B.

The duration burst allocation processing unit 712 starts duration burst allocation processing in the slot table memory 706 when receiving a duration burst allocation start request from the main control unit 701. As for the burst information provided by the parameter by the software processing unit 101, the duration burst allocation processing unit 712 searches whether the duration burst exists or not sequentially, and performs the allocation processing every time the duration burst is recognized, and repeats the allocation processing for the number of times corresponding to the number of bursts. Further, the duration burst allocation processing unit 712 outputs duration burst allocation end notification to the main control unit 701 when the allocation processing is completed. Details of the processing in the duration burst allocation processing unit 712 will be explained later with reference to FIGS. 10A and 10B.

The duration burst address assignment processing unit 723 starts duration burst address assignment processing in the slot table memory 706 when receiving a duration burst address assignment start request from the main control unit 701. Further, the duration burst address assignment processing unit 723 outputs duration burst address assignment processing end notification to the main control unit 701 when the address assignment processing is completed. Details of the processing in the duration burst address assignment processing unit 723 will be explained later with reference to FIGS. 11A and 11B.

The rectangular burst address assignment processing unit 721 starts rectangular burst address assignment processing in the slot table memory 706 when receiving a rectangular burst address assignment start request from the main control unit 701. The rectangular burst address assignment processing unit 721 assigns a pointer address to an instructed coordinate position in the slot table memory 706 in accordance with special data coordinate information received from the data write control unit 702. A completion condition of this processing is controlled by the rectangular burst address assignment start request from the main control unit 701, and therefore, the processing is completed when the request is canceled. That is, the rectangular burst address assignment processing unit 721 receives the special data coordinate information to perform the assignment processing only while the request is being received. Details of the processing in the rectangular burst address assignment processing unit 721 will be explained later with reference to FIGS. 12A and 12B and FIGS. 13A and 13B.

The slot table memory 706 includes an allocation information memory, an available information memory, a rotation information memory, a burst identifier (ID) information memory, and a pointer address information memory. The allocation information memory stores information indicating that a slot is allocated to the uplink sub frame, and allocation of the slot is completed. The available information memory stores information indicating that data exists in the slot allocated to the uplink sub frame. The rotation information memory stores information indicating that the slot allocated to the uplink sub frame is an object for rotation processing. The burst ID information memory stores information indicating a zone ID and a burst ID of the slot allocated to the uplink sub frame. The burst ID corresponds to the uplink bursts (UL Burst) #1 to #3 in FIG. 2. The zone ID is the ID of, for example a zone 903 in FIG. 9A. A zone is divided in the vertical direction on the uplink sub frame, and a modulation method can be changed in each zone. The pointer address information memory stores pointer address information linking the slot allocated to the uplink sub frame and the frame memory 703.

The pointer address management unit 722 calculates and manages the pointer address linking the slot table memory 706 and the frame memory 703. The pointer address is calculated as a first pointer value and an end pointer value in each burst, a first pointer value of the first rectangular burst and a current pointer value used for rectangular burst address assignment, and to be managed. Also, the pointer address management unit 722 notifies the data write control unit 702 of the pointer address used in writing data in the frame memory 703. The pointer address management unit 722 receives the necessary burst information from the data write control unit 702, and notifies the data write control unit 702 of the first pointer value and the end pointer value corresponding to the burst information. Further, the pointer address management unit 722 also notifies the data write control unit 702 of the first pointer value of the first rectangular burst.

The data write control unit 702 writes the burst data in the frame memory 703 in accordance with the burst information obtained by the uplink map (UL-MAP) in FIG. 2 and table information of the pointer address management unit 722. At this time, the data write control unit 702 selects the user data (duration burst) and the control data (rectangular burst) from the burst information, and writes the user data (duration burst) and the control data (rectangular burst) in the frame memory 703. However, in the case of CQICH data of the rectangular burst, considering the software operation processing in a generation process of the CQICH data, determination of a CQICH data position and write processing in the frame memory 703 is separated, and is performed at two stages. Details thereof will be explained later with reference to FIG. 8.

The data read control unit 704 performs handshaking with the coding unit 132 at the subsequent stage, and reads data in each uplink sub frame from the frame memory 703 to transfer it to the coding unit 132. The data read control unit 704 starts data transfer by a data transfer request from the coding unit 132, and completes the operation when the data transfer request is cancelled.

The rotation/renumbering processing unit 708 randomizes the above-described logical allocation area. A method thereof is defined in IEEE16__2004 (8. 4. 6. 2. 6.). Details thereof will be described later.

Figure 8:
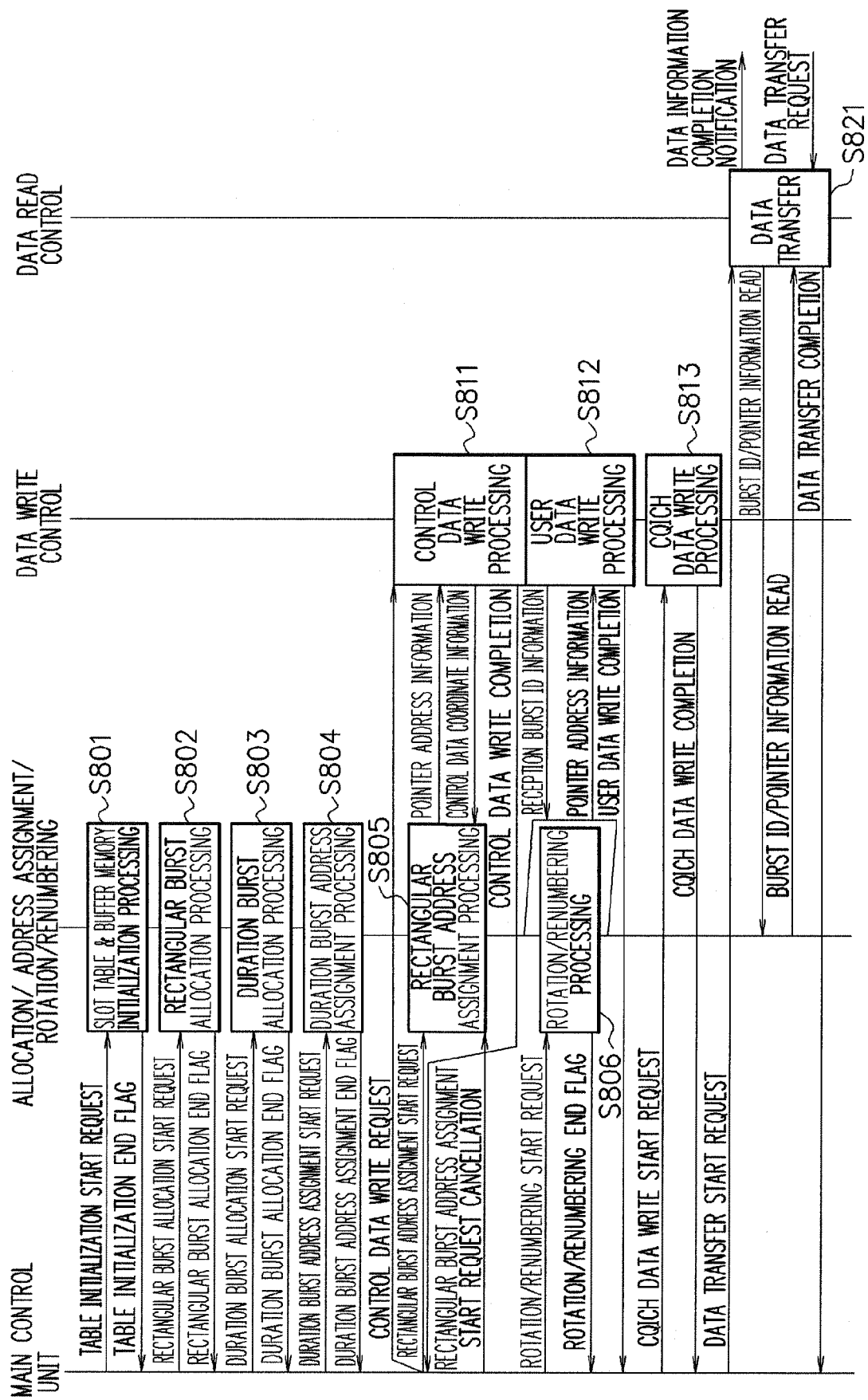
FIG. 8 is a flowchart depicting a processing example in the uplink sub frame structure unit.

FIG. 8 is a flowchart depicting a processing example of the uplink sub frame structure unit 131 in FIG. 7.

Firstly, the main control unit 701 outputs a table initialization start request to the data allocation control unit 705, the address assignment control unit 707, and the rotation/renumbering processing unit 708. Thereafter, at Step S801, the data allocation control unit 705, the address assignment control unit 707, and the rotation/renumbering processing unit 708 initialize the slot table memory 706 and a buffer memory for rotation/renumbering when starting processing in each frame. After initialization, the data allocation control unit 705, the address assignment control unit 707, and the rotation/renumbering processing unit 708 output a table initialization end flag to the main control unit 701. Then, the main control unit 701 instructs initialization to each of the functional blocks.

Next, the main control unit 701 outputs the rectangular burst allocation start request to the rectangular burst allocation processing unit 711. Thereafter, at Step S802, the rectangular burst allocation processing unit 711 performs the rectangular burst allocation processing. The rectangular burst allocation processing unit 711 converts (allocates) position information of the rectangular burst obtained from the software processing unit 101 to coordinate information of the uplink sub frame in methods depicted in FIGS. 9A and 9B. That is, it is the control data such as the fast feedback channel (CQICH), the ranging channel, and the acknowledgement channel in FIG. 2 that is allocated herein. The CQICH data is generated in the CQICH generation unit 130 in FIG. 1, ranging channel data is generated in the ranging generation unit 128 in FIG. 1, and acknowledgement channel data is generated in the ACK/NACK generation unit 129 in FIG. 1.

Figure 9A:
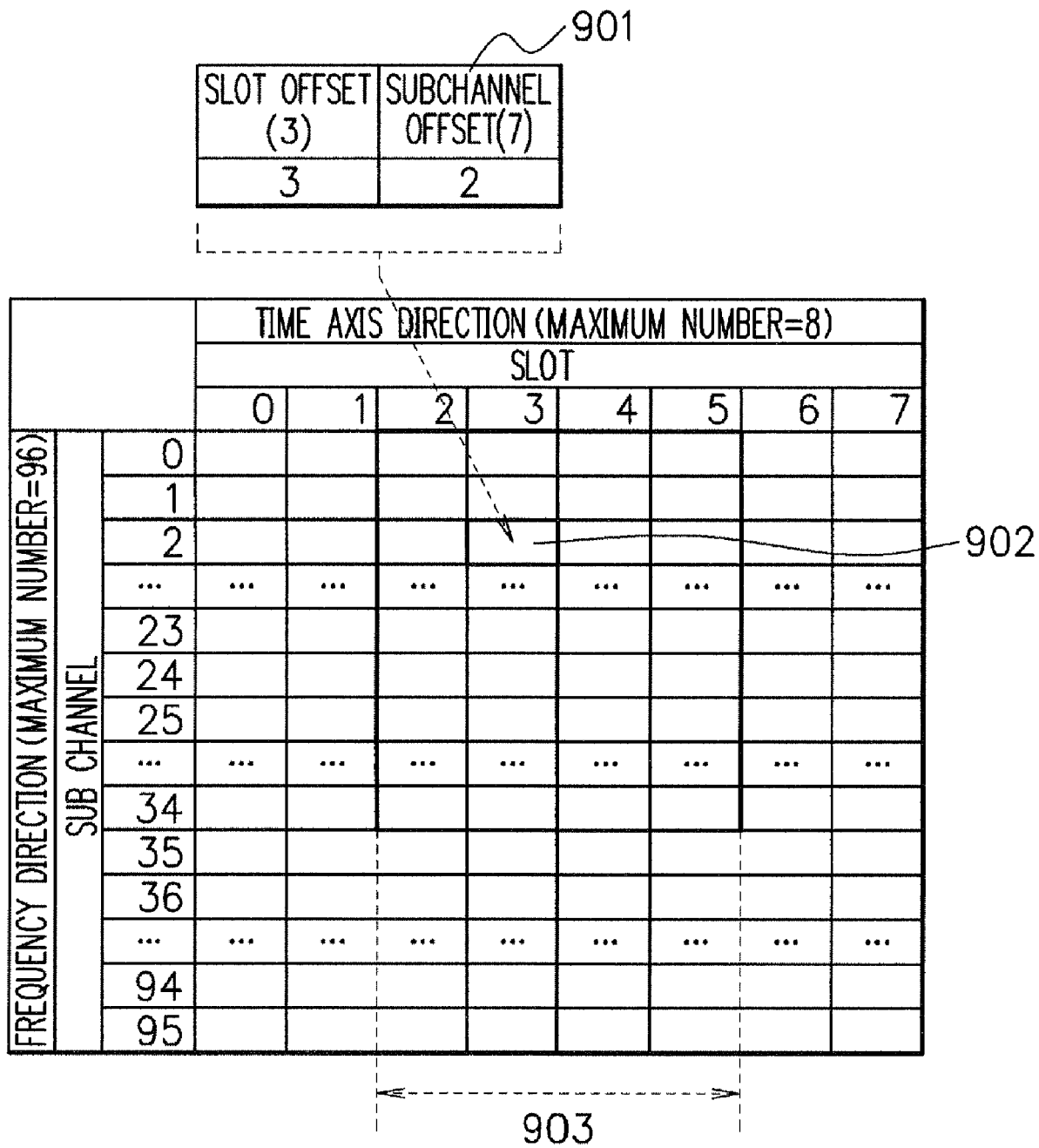
FIGS. 9A and 9B are explanatory views of rectangular burst allocation processing.
Figure 9B:
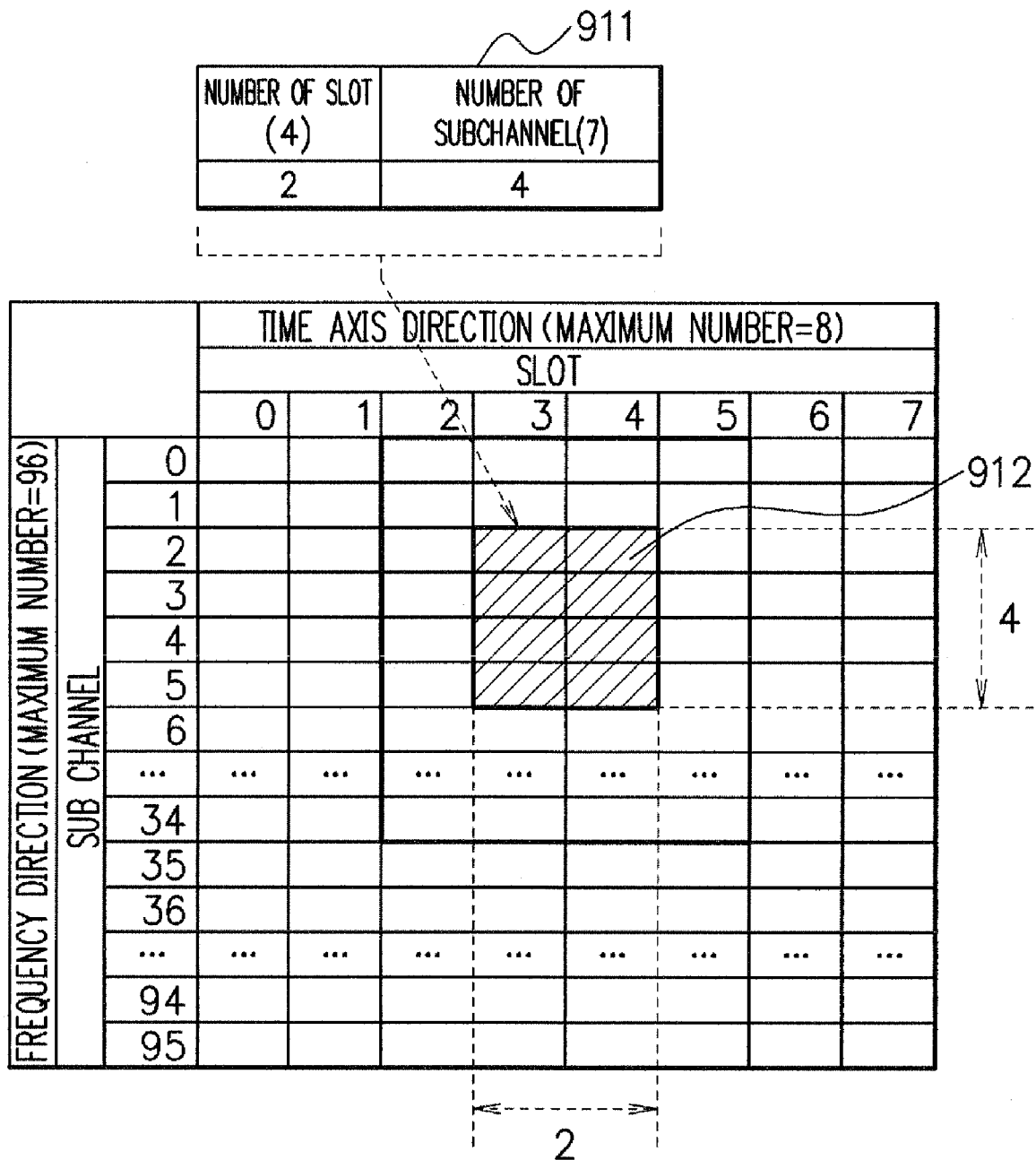

FIGS. 9A and 9B are explanatory views of the rectangular burst allocation processing at Step S802.

FIG. 9A depicts the method to designate first position coordinates of the rectangular burst. The zone 903 represents a current zone. The slot number at a starting position in the current zone 903 is two. The slot number at the starting position in a subsequent zone is six. A parameter 901 represents the first position coordinates of the rectangular burst, and a slot offset is three, and a subchannel offset is two. The reference point of the coordinates is zero in the slot number and zero in the subchannel number, which represents the head of the frame. Coordinates 902 obtained by three in the slot number and two in the subchannel number are designated by the parameter 901 as the first position coordinates of the rectangular burst. Note that the slot offset is synonymous with "OFDMA symbol offset" defined in IEEE 802.16-2004/802.16e.

FIG. 9B depicts the method to designate a rectangular burst area (length and breadth sizes). A parameter 911 represents the rectangular burst area, and the slot number is two, and the subchannel number is four. A rectangular burst area 912 with oblique lines formed by two in the slot number and four in the subchannel number is allocated by the parameter 911. Concretely, information indicating that allocation of the rectangular burst area 912 is completed is stored in the allocation information memory in the slot table memory 706. Note that number of slot is synonymous with "No. OFDMA symbols" defined in IEEE 802.16-2004/802.16e. Further, number of subchannel is synonymous with "No. Subchannels" defined in IEEE 802.16-2004/802.16e.

Next, in FIG. 8, the rectangular burst allocation processing unit 711 outputs a rectangular burst allocation end flag to the main control unit 701 when the above-described rectangular burst allocation processing ends.

Next, the main control unit 701 outputs the duration burst allocation start request to the duration burst allocation processing unit 712. Thereafter, at Step S803, the duration burst allocation processing unit 712 performs the duration burst allocation processing. Concretely, the duration burst allocation processing unit 712 converts (allocates) the position information of the duration burst obtained from the software processing unit 101 to the coordinate information of the uplink sub frame in methods depicted in FIGS. 10A and 10B. That is, it is the user data that is allocated herein. Here, the duration burst is allocated in the number order for only the number of times corresponding to the number of duration bursts avoiding the area that is the rectangular burst and is allocated.

Figure 10A:
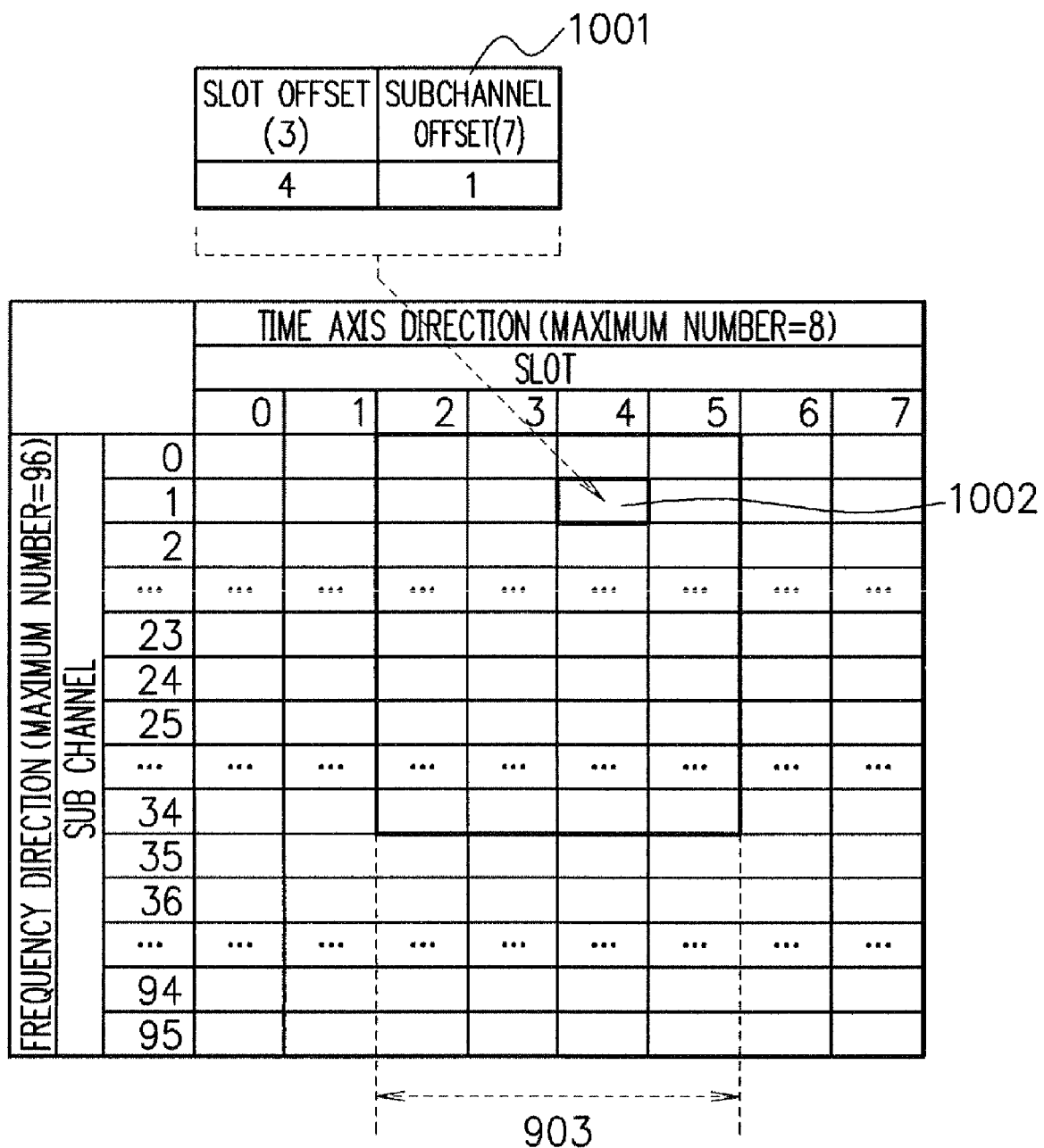
FIGS. 10A and 10B are explanatory views of duration burst allocation processing.
Figure 10B:
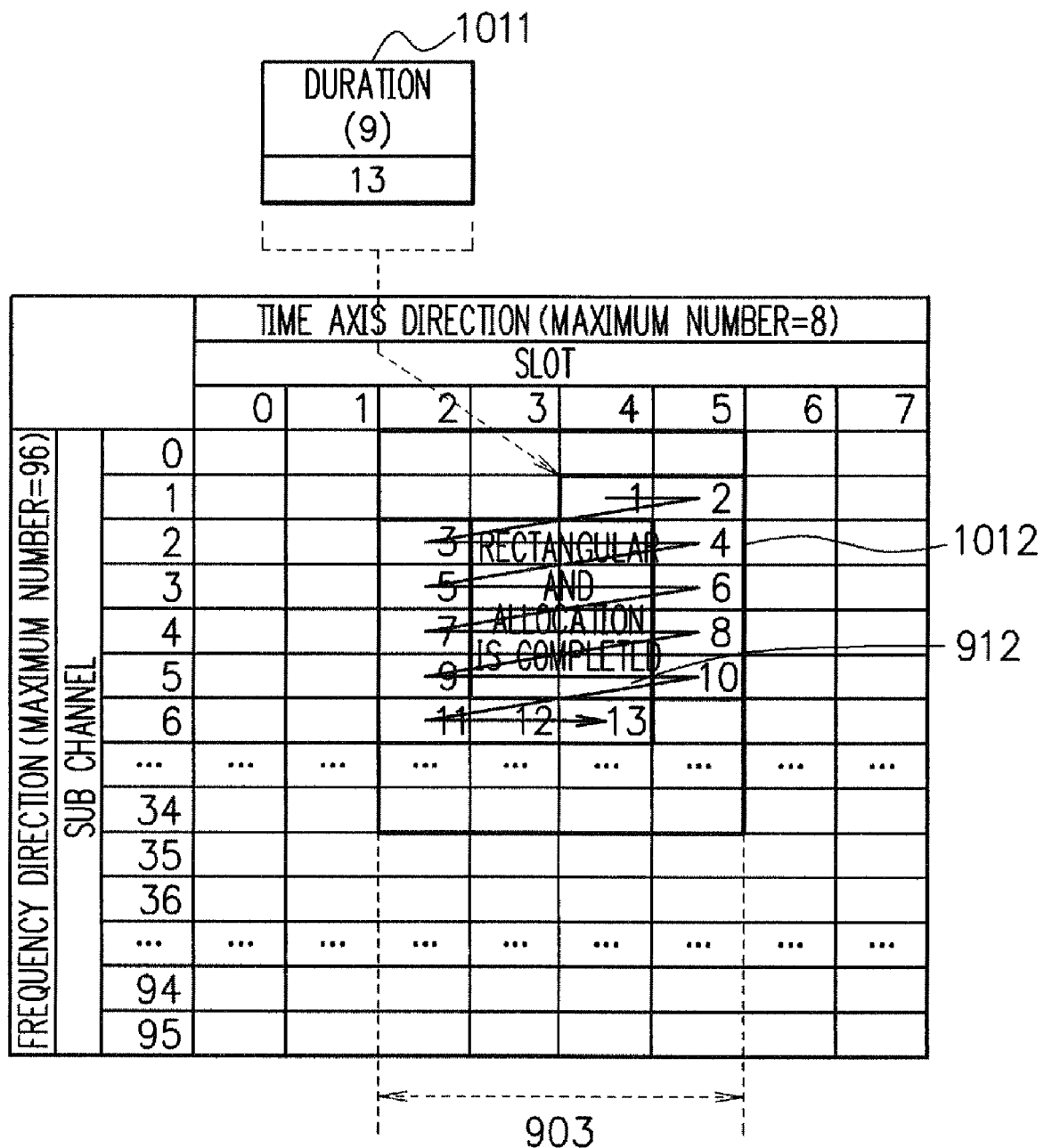

FIGS. 10A and 10B are explanatory views of the duration burst allocation processing at Step S803.

FIG. 10A depicts the method to designate the first position coordinates of the duration burst. A parameter 1001 represents the first position coordinates of the duration burst, and the slot offset is four, and the subchannel offset is one. The reference point of the coordinates is zero in the slot number and zero in the subchannel number, which represents the head of the frame. Coordinates 1002 obtained by four in the slot number and one in the subchannel number are designated as the first position coordinates of the duration burst by the parameter 1001.

FIG. 10B depicts the method to designate continuous number of the duration burst. A parameter 1011 represents the continuous number of the duration burst, and the continuous number is 13. A duration burst area 1012 whose continuous number is 13 is allocated by the parameter 1011 avoiding the rectangular burst area 912 that is allocated. That is, the duration burst area 1012 is allocated in the number order for only the number of times corresponding to the continuous number avoiding the rectangular burst area 912 that is allocated, and when allocation proceeds to the end of the zone 903, allocation turns toward the subjacent subchannel. Concretely, information indicating that allocation of the duration burst area 1012 is completed is stored in the allocation information memory in the slot table memory 706.

Next, in FIG. 8, the duration burst allocation processing unit 712 outputs a duration burst allocation end flag to the main control unit 701 when the above-described duration burst allocation processing ends.

Next, the main control unit 701 outputs the duration burst address assignment start request to the duration burst address assignment processing unit 723. Thereafter, at Step S804, the duration burst address assignment processing unit 723 performs the duration burst address assignment processing. Concretely, the duration burst address assignment processing unit 723 makes information on which the frame memory 703 and coordinate information of the position of the uplink sub frame is linked to draw data in the frame memory 703 from the coordinate information.

FIGS. 11A and 11B are explanatory views of the duration burst address assignment processing at Step S804. FIG. 11A depicts the logical position information, and FIG. 11B depicts the pointer address information memory in the slot table memory 706. The pointer address information memory stores the pointer address (slot address) information linking the slot allocated to the uplink sub frame and the frame memory 703. The duration burst address assignment processing unit 723 makes information on which the frame memory 703 and the coordinate information of the position of the uplink sub frame is linked to write the information in the pointer address information memory in FIG. 11B. The slot address is not the actual address of the frame memory 703 but the address in each slot.

The pointer address management unit 722 links the slot table memory 706 and the frame memory 703 at the slot address and the pointer address.

It is set that the number of slot addresses assigned up to the previous zone is 84. The slot addresses 85 to 97 are assigned to a current zone 1111. The slot addresses 85 to 97 are assigned from the upper left toward down, when assignment proceeds to the bottom end, assignment turns to the subsequent slot, and in such a way, address assignment is performed.

For example, third slot data whose burst ID is five is written in the coordinates obtained by two in the slot number and four in the subchannel number of the uplink sub frame. The slot address at which address assignment is performed detects the burst ID allocated to the slot table memory 706 and an effective state (which means that it is allocated and available) based on a first pointer address value managed in each burst ID, and performs increment for a pointer address value of the detected burst ID (setting the first pointer address value as the reference point), which is calculated as a pointer value of the effective slot coordinates.

Next, in FIG. 8, the duration burst address assignment processing unit 723 outputs a duration burst address assignment end flag to the main control unit 701 when the above-described duration burst address assignment processing ends.

Next, the main control unit 701 outputs the rectangular burst address assignment start request to the rectangular burst address assignment processing unit 721, and outputs a control data write request to the data write control unit 702. Thereafter, at Step S805, the rectangular burst address assignment processing unit 721 performs the rectangular burst address assignment processing, and at Step S811, the data write control unit 702 performs control data write processing.

At Step S805, the rectangular burst address assignment processing unit 721 outputs a first pointer address of the first rectangular burst to the data write control unit 702 via the pointer address management unit 722 when receiving the rectangular burst address assignment request from the main control unit 701.

At Step S811, the data write control unit 702 inputs write data and the coordinate information from the ranging generation unit 128 and/or the ACK/NACK generation unit 129 when receiving the control data write request from the main control unit 701. Further, the data write control unit 702 inputs only the coordinate information from the CQICH generation unit 130.

The data write control unit 702 incrementally writes the write data input continuously from the ranging generation unit 128 and/or the ACK/NACK generation unit 129 in the frame memory 703 setting the first pointer address input from the rectangular burst address assignment processing unit 721 as the starting position. At the same time, the data write control unit 702 outputs the coordinate information to the rectangular burst address assignment processing unit 721. The rectangular burst address assignment processing unit 721 inputs the coordinate information from the data write control unit 702, and writes the pointer address information and available information at the coordinate position indicated by the coordinate information from the pointer address information memory and the available information memory in the slot table memory 706.

Then, as for the CQICH data, since the data write control unit 702 inputs only the coordinate information from the CQICH generation unit 130, the data write control unit 702 outputs the coordinate information to the rectangular burst address assignment processing unit 721, and a write start address to the frame memory 703 is held in the data write control unit 702. The write start address will be used in CQICH data write processing subsequently.

The data write control unit 702 writes the control data except the CQICH data at Step S811 in order to secure a long period of time for CQI value calculation processing in the CQI operation processing unit 111. The CQICH data will be written later at Step S813.

Figure 12A:
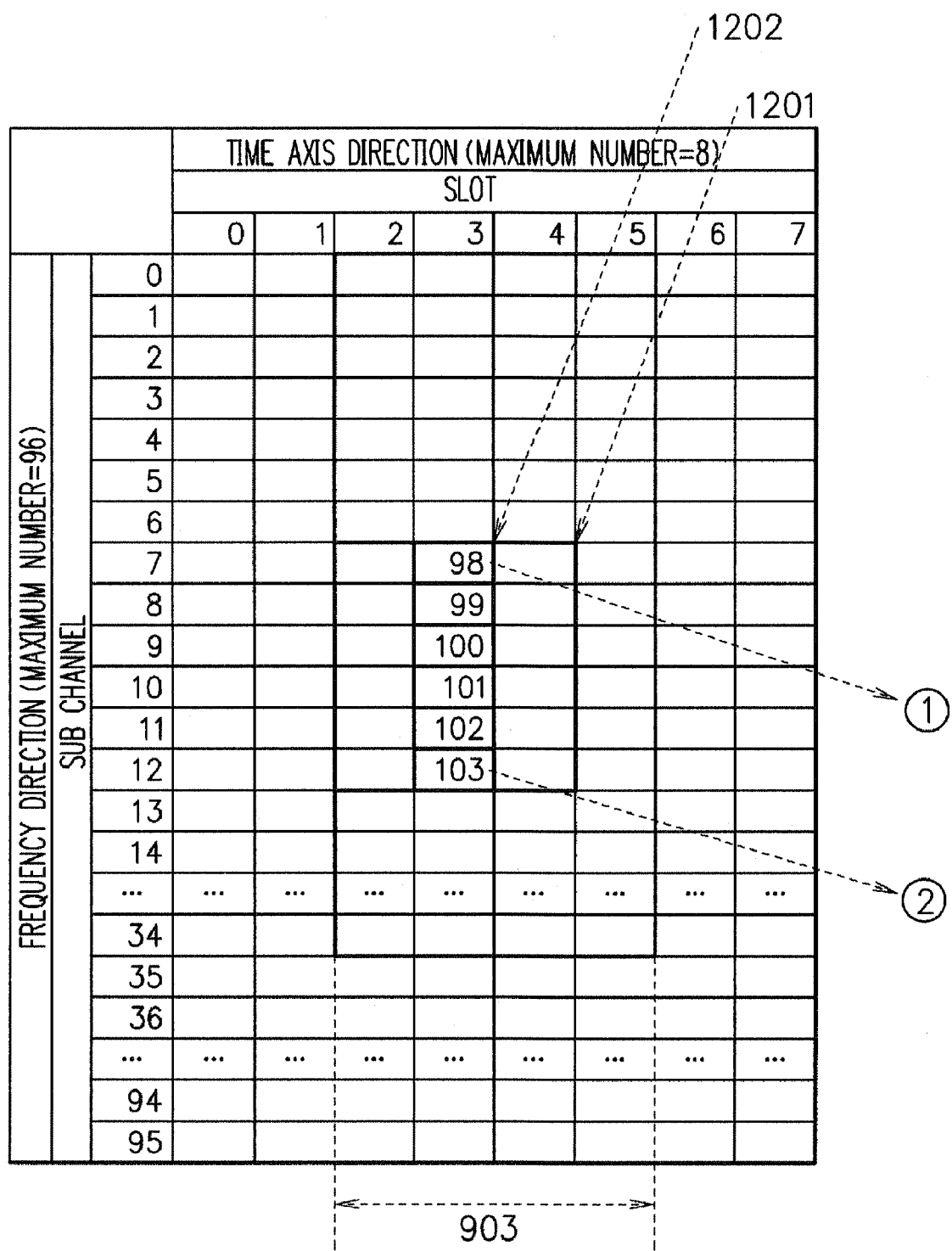

FIGS. 12A and 12B are explanatory views of the rectangular burst address assignment processing at Step S805. FIG. 12A depicts the logical allocation information, and FIG. 12B depicts the pointer address information memory in the slot table memory 706. The rectangular burst address assignment processing is explained exemplifying address assignment of the ranging data.

A rectangular burst area 1201 is a ranging rectangular burst area whose burst ID is four. Slot data 1202 is ranging slot data in the ranging rectangular burst area 1201, and the slot addresses 98 to 103 are assigned to the current zone 903. The available information indicating that the data exists is written in the slot of the slot data 1202, and the available information indicating that the data does not exist is stored in the slots except the slot data 1202 in the ranging rectangular burst area 1201. Note that the maximum number and the data length of the ranging data change according to conditions.

The offset of the ranging rectangular burst area 1201 is indicated by the coordinates starting from the first coordinates of the uplink sub frame. There is depicted an example that the burst ID of the ranging rectangular burst area 1201 is set as four. In this example, address assignment is performed in its own segment area formed by a 35-subchannel-width in the frequency direction and the zone 903 having a four-slot-width from two to five in the slot number in the time axis direction.

A rectangular area formed by a three-slot-width and a six-subchannel-width is allocated to the ranging rectangular burst area 1201 setting the coordinate position obtained by two in the slot number and seven in the subchannel number as the starting coordinates. There is depicted that 98 is assigned to the coordinate position obtained by three in the slot number and seven in the subchannel number as the pointer address in the above rectangular area 1201.

The actual address assignment processing turns to a reception waiting state of the coordinate information of the control data from the data write control unit 702 when the rectangular burst address assignment processing unit 721 receives the rectangular burst address assignment start request from the main control unit 701.

Next, in FIG. 8, the data write control unit 702 outputs control data write completion notification to the main control unit 701 when the above-described control data write processing ends. Thereafter, the main control unit 701 outputs rectangular burst address assignment start request cancellation notification to the rectangular burst address assignment processing unit 721.

Next, at Step S812, the data write control unit 702 performs user data write processing. The data write control unit 702 outputs an output request to the software processing unit 101 by using parameter information from the software processing unit 101 after receiving a user data write start request from the main control unit 701. The data write control unit 702 inputs the burst ID and the user data from the software processing unit 101, and receives the first address and the end address of the frame memory 703 reserved in the duration burst address assignment processing beforehand from the duration burst address assignment processing unit 723, and writes the data in the frame memory 703 in the order in which the address is received. When writing is completed, the data write control unit 702 outputs user data write completion notification to the main control unit 701.

Next, the main control unit 701 outputs a rotation/renumbering start request to the rotation/renumbering processing unit 708. Thereafter, at Step S806, the rotation/renumbering processing unit 708 performs rotation/renumbering processing only with the allocation information on which the above-described allocation processing is performed, and outputs a rotation/renumbering end flag to the main control unit 701 when the rotation/renumbering processing ends.

The rotation processing is processing to rotate the data corresponding to the subchannel to be an object in each slot column in the time axis direction to the frequency direction. The renumbering processing reallocates the data to the subchannel indicated by an effective bitmap depending on physical bitmap information with respect to the result after the rotation processing, and converts to physical mapping. A method thereof is defined in IEEE16_2004 (8.4.6.2.6.), and can be realized by using a temporary memory, and the like. The renumbering processing is performed excluding the coordinates of the rectangular burst and the object for which rotation is not performed at setting.

Next, the main control unit 701 outputs a CQICH data write start request to the data write control unit 702. Thereafter, at Step S813, the data write control unit 702 performs the CQICH data write processing, and outputs CQICH data write completion notification to the main control unit 701 when the CQICH data write processing ends.

The data write control unit 702 inputs the CQICH data from the CQICH generation unit 130 when receiving the CQICH data write start request from the main control unit 701. The data write control unit 702 writes the CQICH data in the frame memory 703 by using the write start address of the CQICH data held in the control data write processing at Step S811.

FIGS. 13A and 13B are explanatory views of the rectangular burst address assignment processing at Step S805. FIG. 13A depicts the logical allocation information, and FIG. 13B depicts the pointer address information memory in the slot table memory 706. The rectangular burst address assignment processing is explained exemplifying address assignment of the CQICH data.

A rectangular burst area 1301 is a CQICH rectangular burst area whose burst ID is four. Slot data 1302 is CQICH slot data in the CQICH rectangular burst area 1301. The slot addresses 98 and 99 are assigned to the current zone 903. The available information indicating that the data exists is written in the slot of the slot data 1302, and the available information indicating that the data does not exist is stored in the slots except the slot data 1302 in the CQICH rectangular burst area 1301.

The offset of the CQICH rectangular burst area 1301 is indicated by the coordinates starting from the first coordinates of the uplink sub frame. In the case when the burst ID of the CQICH rectangular burst area 1301 is set as four, address assignment is performed in its own segment area formed by a 35-subchannel-width in the frequency direction and the zone 903 having a four-slot-width from two to five in the slot number in the time axis direction. A rectangular area formed by a three-slot-width and a six-subchannel-width is allocated to the CQICH rectangular burst area 1301 setting the coordinate position obtained by two in the slot number and seven in the subchannel number as the starting coordinates.

There is depicted that 98 is assigned to the coordinate position obtained by three in the slot number and nine in the subchannel number as the slot address in the above rectangular area 1301. The actual address assignment processing is started when the rectangular burst address assignment processing unit 721 receives the rectangular burst address assignment start request from the main control unit 701, and the address assignment processing ends when the rectangular burst address assignment start request is cancelled.

Next, in FIG. 8, the main control unit 701 outputs a data transfer start request to the data read control unit 704. Thereafter, at Step S821, the data read control unit 704 performs data transfer.

The data read control unit 704 outputs data structure completion notification to the coding unit 132 when data writing of the uplink sub frame at Step S811 to Step S813 is all completed. The coding unit 132 outputs the data transfer request to the data read control unit 704 in synchronization with the start time of data transfer after receiving the data structure completion notification. The data read control unit 704 starts data transfer processing from the frame memory 703 to the coding unit 132 when receiving the data transfer request. The data read control unit 704 reads the burst ID information and the pointer address information from the slot table memory 706 in order to perform frame data output processing to the coding unit 132. The timing of reading the burst ID information and the pointer address information is managed by the main control unit 701. The data read control unit 704 outputs data transfer completion notification to the main control unit 701 after data transfer is completed.

A window for data writing in the CQICH data whose data is calculated after a long period of time taken by the software operation processing and a window for data writing in other data are separated, and an operation window thereof can be set at the timing immediately before generation of the uplink sub frame is completed by the above controls.

Note that there is depicted the example in which the slot table memory 706 in which a data allocation management to the frame is performed in each slot is used in the present embodiment, however, the example can be also realized by using the slot table memory 706 in which the data allocation management to the frame is performed in each symbol, with the result that more detailed allocation control and data control can be possible. The single slot includes a plurality of symbols.

FIG. 5 is a view depicting a schedule of frame structure processing (a communication method) in the mobile station terminal device in the present embodiment, and corresponds to FIG. 3 and FIG. 4.

A time t11 represents a software operation start time. At the time t11, calculation operation processing of the CQI value (data) and ACK/NACK information is performed by software processing. Concretely, in the software processing unit 101, the CQI operation processing unit 111 calculates the CQI value, and the ACK/NACK processing unit 112 generates the ACK/NACK information. The CQICH generation unit 130 generates the CQICH signal based on the CQI value calculated by the CQI operation processing unit 111. The ACK/NACK generation unit 129 generates the ACK/NACK signal based on the ACK/NACK information generated by the ACK/NACK processing unit 112.

A time t12 represents a closing time of the CQI value (data). Before the time t12, rectangular data area reservation processing, user data allocation processing, and the rotation/renumbering processing is performed by hardware processing. Allocation of rectangular data is not performed in the rectangular data area reservation processing since the CQI value is not calculated. The rectangular data area reservation processing corresponds to the rectangular burst allocation processing at Step S802 in FIG. 8. The user data allocation processing corresponds to the duration burst allocation processing at Step S803, the duration burst address assignment processing at Step S804, and the user data write processing at Step S812 in FIG. 8. The rotation/renumbering processing corresponds to the rotation/renumbering processing at Step S806 in FIG. 8.

The rotation processing is a function to reallocate (randomize) the logical allocation area in accordance with a rule. Concretely, data corresponding to the subchannel to be the object in each slot column in the time axis direction is rotated in the frequency direction, and thereby allocation is changed. The renumbering processing is processing to reallocate the data to the subchannel indicated by the effective bitmap depending on the physical bit map information with respect to the result after the rotation processing, and convert to the physical mapping.

At the time t12, since the CQI value is calculated, the rectangular data including information of the CQI value is allocated. Processing thereof corresponds to the CQICH data write processing at Step S813 in FIG. 8. The rectangular data includes the ranging channel and the acknowledgement channel besides the fast feedback channel (the information of the CQI value) in FIG. 2. The rectangular data of the ranging channel and the acknowledgement channel is written in the control data write processing at Step S811 in FIG. 8.

After the above-described processing is completed, at a time t13, the wireless transmission unit 135 transmits the data in synchronization with the transmission timing of the uplink sub frame. The time t13 represents a closing time of a frame structure.

The CQI value is calculated by the software processing, and a large number of operation processing is necessary, resulting that a long period of time may be needed. Further, the mobile station terminal device that receives an instruction from the base station device has to transmit the fast feedback channel to the uplink sub frame of the subsequent frame, and therefore, time for calculating the CQI value is limited.

In FIG. 4, time for a CQI value calculation is from a time t1 to a time t2, which is a short time. By contrast, in the present embodiment, the rectangular data area reservation processing, the user data allocation processing, and the rotation/renumbering processing is performed before the time t12, and thereby, as the time for the CQI value calculation, a long period of time, which is from the time t11 to the time t12, can be secured. The present embodiment makes it possible to take a long time for the CQI value calculation, and thereby, the software processing of the CQI value calculation can be performed with a margin. Consequently, the frame can be structured with a margin, resulting that the data can be transmitted securely. The present embodiment makes it possible to take a long period of time for the processing such as calculation processing of the channel quality indicator (CQI) necessary for a large number of operation processing, and makes the software processing reduced, and thereby, lack of the data in the uplink sub frame and making the data in the uplink sub frame not transmitted can be prevented.

According to a transmission frame structure control method in the mobile station terminal device, time can be applied to the CQI value calculation immediately before the time when the data of the uplink sub frame is transmitted, as a result that the software processing is reduced, and an effect of which making the CQICH data not transmitted is prevented is provided. Further, the method can be also applied to the ranging data, the acknowledgement channel (HARQ ACK) data, and sounding data besides the CQICH data.

Also, the data processing and the allocation processing is separated, and thereby, the actual data is not processed, but the allocation information is processed, and thus an amount of data to be processed becomes small, resulting that it is possible to make the size of a buffer for processing small, and to miniaturize circuits necessary for the processing.

In the mobile station terminal device (communication device) in the present embodiment, a first control data generation unit includes the CQI operation processing unit 111 and the CQICH generation unit 130 to generate first control data. The first control data represents, for example, the channel quality indicator (CQICH data). A control data allocation processing unit (the rectangular burst allocation processing unit) 711 performs the allocation processing for the first control data in order to reserve an area for the first control data in the frame memory 703. The data write control unit 702 writes the user data in the frame memory 703. The wireless transmission unit 135 transmits the transmission data based on the data written in the frame memory 703. The data write control unit 702 writes the generated first control data in the area where the allocation processing is performed in the frame memory 703 after generation of the first control data and after the allocation processing of the first control data and after writing the user data and before the transmission data is transmitted.

The rotation/renumbering processing unit 708 performs the rotation processing and/or the numbering processing based on information on which the allocation processing is performed for the first control data after the allocation processing of the first control data and before the first control data is written.

The control data allocation processing unit 711 performs the allocation processing for the first control data in each slot to write allocation information thereof in the slot table memory 706. The rotation/renumbering processing unit 708 performs the rotation processing and/or the renumbering processing based on the allocation information in the slot table memory 706.

Note that the data allocation management to the frame may be performed in each symbol in the slot table memory 706. The control data allocation processing unit 711 performs the allocation processing for the first control data in each symbol to write allocation information thereof in the slot table memory 706. The rotation/renumbering processing unit 708 performs the rotation processing and/or the renumbering processing based on the allocation information in the slot table memory 706.

A second control data generation unit includes the ACK/NACK processing unit 112, the ACK/NACK generation unit 129, and the ranging generation unit 128 to generate second control data. The second control data represents, for example, the ranging channel data generated in the ranging generation unit 128 or the acknowledgement channel data generated in the ACK/NACK generation unit 129. The data write control unit 702 writes the generated second control data before writing the user data.

A user data allocation processing unit (the duration burst allocation processing unit) 712 performs the allocation processing for the user data in order to reserve an area for the user data in the frame memory 703 before the user data is written.

The control data allocation processing unit 711 performs the rectangular burst allocation processing. The user data allocation processing unit 712 performs the duration burst allocation processing after the rectangular burst allocation processing.

According to the present embodiment, it becomes possible to take sufficient time for generation processing of the first control data that is necessary for a large number of operations, and a load of the generation processing of the first control data is reduced, resulting that lack of the first control data in the frame and making the first control data in the frame not transmitted can be prevented.

It becomes possible to take sufficient time for the generation processing of the first control data that is necessary for a large number of operations, and the load of the generation processing of the first control data is reduced, resulting that lack of the first control data in the frame and making the first control data in the frame not transmitted can be prevented.

Besides, the above-described embodiment is to be considered in all respects as illustrative and no restrictive. Namely, the present embodiment may be embodied in other specific forms without departing from the spirit or essential characteristics thereof.

All examples and conditional language recited herein are intended for pedagogical purposes to aid the reader in understanding of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A communication device comprising:
   a first control data generation unit configured to generate first control data;
   a control data allocation processing unit configured to perform allocation processing for the first control data in order to reserve an area for the first control data in a frame memory;
   a data write control unit configured to write user data in an area in the frame memory except the area where the allocation processing is performed; and
   a transmission unit configured to transmit transmission data based on the data written in the frame memory, and
   wherein the data write control unit writes the generated first control data in the area where the allocation processing is performed in the frame memory after generation of the first control data and after the allocation processing of the first control data and after writing the user data and before the transmission data is transmitted.

2. The communication device according to claim 1, further comprising:
   a rotation and renumbering processing unit configured to perform at least one of rotation processing and renumbering processing based on information on which the allocation processing is performed for the first control data after the allocation processing of the first control data and before the first control data is written.

3. The communication device according to claim 2, wherein
   the control data allocation processing unit performs the allocation processing for the first control data in each slot to write allocation information thereof in a table memory, and
   the rotation and renumbering processing unit performs at least one of the rotation processing and the renumbering processing based on the allocation information in the table memory.

4. The communication device according to claim 2, wherein the control data allocation processing unit performs the allocation processing for the first control data in each symbol to write allocation information thereof in a table memory, and the rotation and renumbering processing unit performs at least one of the rotation processing and the renumbering processing based on the allocation information in the table memory.

5. The communication device according to claim 1, wherein the first control data is a channel quality indicator.

6. The communication device according to claim 1, further comprising:

a second control data generation unit configured to generate second control data, and wherein the data write control unit writes the generated second control data before writing the user data.

7. The communication device according to claim 1, further comprising:

a user data allocation processing unit configured to perform the allocation processing for the user data in order to reserve an area for the user data in the frame memory before the user data is written.

8. The communication device according to claim 7, wherein the control data allocation processing unit performs rectangular burst allocation processing, and the user data allocation processing unit performs duration burst allocation processing after the rectangular burst allocation processing.

9. The communication device according to claim 6, wherein the first control data at least comprises a channel quality indicator and the second control data is ranging channel data or acknowledgement channel data.

10. The communication device according to claim 1, wherein the first control data at least comprises acknowledgement channel data.

11. The communication device according to claim 1, wherein the first control data at least comprises ranging channel data.

12. A communication method comprising:

generating first control data;

performing allocation processing for the first control data in order to reserve an area for the first control data in a frame memory;

writing user data in an area in the frame memory except the area where the allocation processing is performed;

writing the generated first control data in the area where the allocation processing is performed in the frame memory after generation of the first control data and after the allocation processing of the first control data and after writing the user data; and transmitting transmission data based on the data written in the frame memory.

* * * * *